(12) United States Patent
Jin et al.

(10) Patent No.: US 12,381,391 B1
(45) Date of Patent: Aug. 5, 2025

(54) COLLABORATIVE OPTIMIZATION METHOD, SYSTEM, EQUIPMENT AND STORAGE MEDIUM FOR ELECTRIC AND HEATING NETWORKS AND BUILDING USER

(71) Applicant: Tianjin University, Tianjin (CN)

(72) Inventors: Xiaolong Jin, Tianjin (CN); Shuo Liang, Tianjin (CN); Hongjie Jia, Tianjin (CN); Yunfei Mu, Tianjin (CN); Wei Wei, Tianjin (CN); Xiaodan Yu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/894,032

(22) Filed: Sep. 24, 2024

(30) Foreign Application Priority Data

May 8, 2024 (CN) .......................... 202410557799.8

(51) Int. Cl.
*H02J 3/00* (2006.01)
*F24D 12/02* (2006.01)

(52) U.S. Cl.
CPC .............. *H02J 3/003* (2020.01); *F24D 12/02* (2013.01); *F24D 2200/32* (2013.01); *H02J 2203/20* (2020.01)

(58) Field of Classification Search
CPC .......... G05B 19/042; G05B 2219/2614; F24D 12/02; F24D 2200/32; H02J 3/003; H02J 2203/20
USPC ....................................................... 700/295
See application file for complete search history.

(56) References Cited

U.S. PATENT DOCUMENTS

| | | | |
|---|---|---|---|
| 10,190,793 B2* | 1/2019 | Drees | F24F 11/30 |
| 10,495,334 B2* | 12/2019 | Perez | H04L 67/303 |
| 10,692,161 B2* | 6/2020 | Saratsis | G06Q 50/163 |
| 10,915,094 B2* | 2/2021 | Wenzel | G06Q 50/06 |
| 11,732,967 B2* | 8/2023 | Rousselet | F28C 1/14 |
| | | | 700/282 |
| 11,754,984 B2* | 9/2023 | Patel | G05B 13/041 |
| | | | 700/277 |
| 11,913,655 B2* | 2/2024 | Gamroth | B01D 37/04 |
| 2021/0215438 A1* | 7/2021 | Griffith | F28D 20/0034 |
| 2021/0325069 A1* | 10/2021 | Cotton | F24F 5/0021 |

* cited by examiner

*Primary Examiner* — Ronald D Hartman, Jr.
(74) *Attorney, Agent, or Firm* — Li & Cai Intellectual Property Office

(57) ABSTRACT

A collaborative optimization method for an Electric and Heating Networks (EHN) and a building user includes: establishing a coordinated optimization scheduling framework of the EHN and a building in a park; based on the coordinated optimization scheduling framework, constructing an optimal thermal power flow scheduling model of the EHN, and constructing a building model to simulate thermal characteristics and energy consumption of the building; based on the optimal thermal power flow scheduling model and the building model, taking the lowest operation cost of EHN and the lowest heat consumption of building user as a goal, constructing a collaborative optimization model of the EHN and the building user; outputting a collaborative optimization scheme of the optimal thermal power flow scheduling of the EHN and the heat consumption of the building user through the collaborative optimization model of the EHN and the building user.

18 Claims, 11 Drawing Sheets

COLLABORATIVE OPTIMIZATION METHOD, SYSTEM, EQUIPMENT AND STORAGE MEDIUM FOR ELECTRIC AND HEATING NETWORKS AND BUILDING USER

CROSS REFERENCE TO THE RELATED APPLICATIONS

This application is based upon and claims priority to Chinese Patent Application No. 202410557799.8, filed on May 8, 2024, the entire contents of which are incorporated herein by reference.

TECHNICAL FIELD

This patent involves the field of collaborative optimization operation technology of Electric and Heating Networks, which specifically involves collaborative optimization method, system, equipment and storage medium for Electric and Heating Networks and building user in the park considering multi-taste energy cascade utilization.

BACKGROUND

Electrical and Heating Networks (EHN) have been widely used to provide integrated energy cascade for the building in the park. In addition, because the diversified capacity and energy conversion equipment in the park can provide multi-taste energy supply option for the building in the park, at the same time, the thermodynamic characteristics of the building lead to its thermal inertia, which can be used in the park's capacity and energy conversion equipment. Therefore, the collaborative interaction between EHN and building has important research value. For EHN and consumer of park, how to minimize the economic cost of EHN and reduce the heating energy cost of consumer under the premise of ensuring the comfort temperature for consumer has become an urgent problem to be solved.

SUMMARY

This patent provides collaborative optimization method, system, equipment and storage medium for Electric and Heating Networks and building user to solve or alleviate one or more of the above technical problems in existing technology.

According to one aspect of this patent, the collaborative optimization method for the EHN and the building user is provided, including:
S1, establishing a coordinated optimization scheduling framework of the EHN and the building in a park;
S2, based on the coordinated optimization scheduling framework, constructing an optimal thermal power flow scheduling model of the EHN, and constructing a building model to simulate thermal characteristics and energy consumption of the building;
S3, based on the optimal thermal power flow scheduling model and the building model, taking a lowest operation cost of EHN and a lowest heat consumption of building user as a goal, constructing a collaborative optimization model of the EHN and the building user;
S4, outputting a collaborative optimization scheme of the optimal thermal power flow scheduling of the EHN and the heat consumption of the building user through the collaborative optimization model of the EHN and the building user;

In a possible implementation, the optimal thermal power flow scheduling model includes a hydraulic model, a thermal model, a heat exchanger model, a radiator model and a capacity and energy conversion equipment model.

Constraints of the hydraulic model include a node net flow constraint and a head loss constraint.

Constraints of the thermal model include a node flow conservation constraint, a pipeline heat dissipation constraint, and an energy conservation constraint of heat source and load.

Constraints of the heat exchanger model include a heat balance constraint of the heat exchanger;

Constraints of the radiator model include a heat constraint released by the radiator;

Constraints of the capacity and energy conversion equipment model include energy conversion constraints of a combined heat and power (CHP) unit and a heat pump.

In the possible implementation, constraints of the building model include a heat balance constraint of wall in a heating zone of the building and a heat balance constraint of indoor air in the heating zone of the building.

In the possible implementation, in the collaborative optimization model of the EHN and the building user, constraints corresponding to the goal of the lowest operating cost of the EHN include: an electricity balance constraint, a heat balance constraint, an energy purchase constraint and a node water temperature constraint.

In the possible implementation, in the collaborative optimization model of the EHN and the building user, constraints corresponding to the goal of the lowest heat consumption of the building user include: a user strategy constraint and a radiator property constraint.

According to one aspect of this patent, the collaborative optimization system for the EHN and the building user is provided, which is characterized by:
An establishing unit, which is used to establish the coordinated optimization scheduling framework of the EHN and the building in the park;
A first construction unit, which is used to construct the optimal thermal power flow scheduling model of the EHN and construct the building model to simulate thermal characteristics and energy consumption of the building based on the coordinated optimization scheduling framework;
A second construction unit, which is used to construct the collaborative optimization model of the EHN and the building user based on the optimal thermal power flow scheduling model and the building model, and taking the lowest operation cost of the EHN and the lowest heat consumption of the building user as the goal;
An outputting unit, which is used to output the collaborative optimization scheme of the optimal thermal power flow scheduling of the EHN and the heat consumption of the building user through the collaborative optimization model of the EHN and the building user;
In the possible implementation, the optimal thermal power flow scheduling model includes the hydraulic model, the thermal model, the heat exchanger model, the radiator model and the capacity and energy conversion equipment model.

The constraints of the hydraulic model include the node net flow constraint and the head loss constraint.

The constraints of the thermal model include the node flow conservation constraint, the pipeline heat dissipation constraint, and the energy conservation constraint of the heat source and the load.

The constraints of the heat exchanger model include the energy conversion constraint of the CHP unit and the heat pump;

The constraints of the radiator model include the heat constraint released by the radiator;

The constraints of the capacity and energy conversion equipment model include energy conversion constraints of the CHP unit and the heat pump.

In the possible implementation, the constraints of the building model include the heat balance constraint of the wall in the heating zone of the building and the heat balance constraint of the indoor air in the heating zone of the building.

In the possible implementation, in the collaborative optimization model of the EHN and the building user, the constraints corresponding to the goal of the lowest operating cost of the EHN include: the electricity balance constraint, the heat balance constraint, the energy purchase constraint and the node water temperature constraint.

In the possible implementation, in the collaborative optimization model of the EHN and the building user, the constraints corresponding to the goal of the lowest heat consumption of the building user include: the user strategy constraint and the radiator property constraint.

According to one aspect of this patent, the collaborative optimization equipment for the EHN and the building user is provided, including:

A processor and a memory;

The memory is used to store a computer program, and the processor calls the computer program stored in the memory to perform the collaborative optimization method of the EHN and the building user described in any of the above items.

According to one aspect of this patent, a computer readable storage medium is provided, the computer readable storage medium stores the computer program. When the computer program is executed by the processor, the processor can perform any of the above-mentioned collaborative optimization methods for the EHN and the building user.

The patent in this paper has the following beneficial effects: the patent in this paper provides a collaborative optimization method for EHN and building user in the park considering multi-taste energy cascade utilization. Firstly, the optimal thermal power flow scheduling model including the CHP unit, the heat exchange station and the heat pump is constructed; the thermal resistance-heat capacity (R-C) network is used to model the thermal characteristics of the building, and the thermal inertia of the building and the autonomous adjustment of the radiator are further considered. Secondly, a collaborative optimization model of EHN and building user in the park considering multi-taste energy cascade utilization is proposed, from the perspective of EHN and building user, the operation cost of EHN and the heat cost of building user are minimized while meeting the heat load.

Details of one or more embodiments of this application are set out in the drawings and descriptions below. Other features and advantages of this application will become obvious in the drawings attached to the instruction. It should be understood that the above general description and the subsequent detailed description are only illustrative and explanatory, and do not limit this patent.

BRIEF DESCRIPTION OF THE DRAWINGS

The drawings here are incorporated into the instruction and form part of the instruction, showing the embodiments in line with this patent, and are used together with the instruction to explain the principle of this patent. Obviously, the drawings in the following description are only some of the embodiments disclosed in this paper. For ordinary technicians in this field, other drawings can be obtained according to these drawings without paying creative labor.

DETAILED DESCRIPTION OF THE EMBODIMENTS

Figure 1:
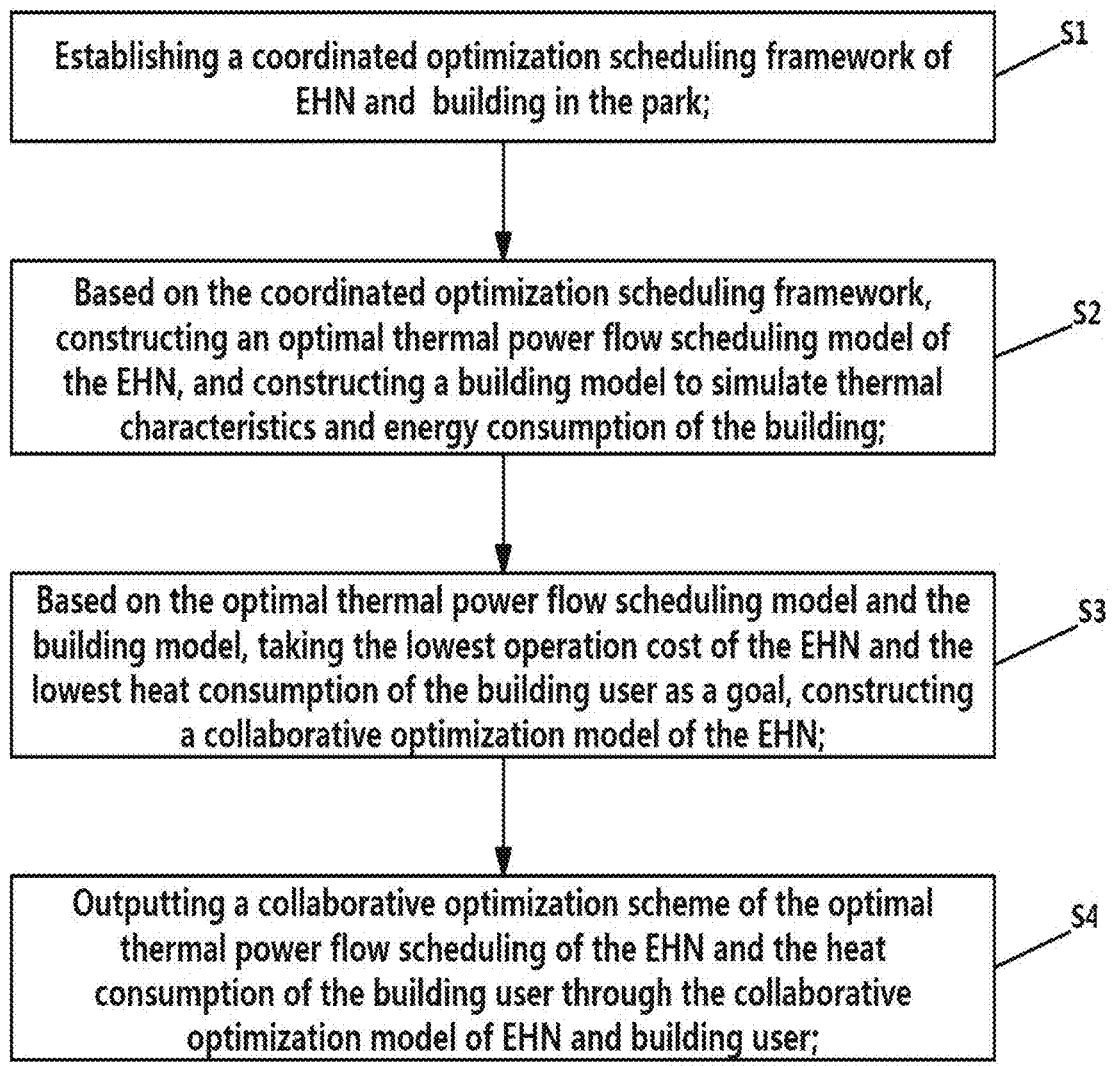
FIG. 1 is a flow chart of the collaborative optimization method for EHN and building user of this embodiment.

Now we will refer to the drawings to describe the embodiments more comprehensively. However, the embodiments can be implemented in many forms and should not be understood as limited to the embodiments described here; by contrast, the provision of these embodiments makes this patent more comprehensive and complete, and conveys the idea of the embodiments to technicians in the field in a comprehensive manner. The features, structures or characteristics described can be combined in one or more implementations in any appropriate way. In the following description, many specific details are provided to give a full understanding of the implementation of this patent. However, technicians in this field will realize that one or more of the specific details described can be omitted by practicing this open technical solution, or other methods, components, devices, steps, etc. can be used. In other cases, any aspect of this patent may be obscured by not showing or describing in detail the well-known technical schemes in order to avoid that the sauce is better than the fish.

In addition, the drawings here are only schematic diagrams of this patent and are not necessarily drawn in proportion. The same tags in the diagram represent the same or similar parts, thus the repeated descriptions of them are omitted. Some of the block diagrams shown in the drawings are functional entities that do not necessarily have to correspond to physically or logically independent entities. These functional entities can be implemented in software form, either in one or more hardware units or integrated circuit, or in different networks and/or processor devices and/or microcontroller devices.

The flow chart shown in the drawing is only an example description, not all steps must be included. For example, some steps can also be decomposed, and some steps can be merged or partially merged, so the order of actual execution may change according to the actual situation.

The terms 'first', 'second', etc. in the specification and claim of this application and the above-mentioned drawings are used to distinguish similar objects, and need not be used to describe a specific order or precedence. It should be understood that the data used in this way can be interchanged under appropriate circumstance so that the embodiments of this application described here, for example, can be implemented in the order other than those illustrated or described here.

In addition, the terms 'include' and 'have' and any deformation of them are intended to cover non-exclusive inclusion, for example, the process, method, system, product or device that contains a series of steps or sub-modules do not have to be limited to those steps or sub-modules that are clearly listed, but may include other steps or sub-modules that are not clearly listed or are inherent to these process, method, product or device.

FIG. 1 is one of the flow charts of the collaborative optimization method for Electric and Heating Networks (EHN) and building user in this embodiment. As shown in FIG. 1, the embodiment of this patent provides a collaborative optimization method for EHN and building user, including:

S1, establishing a coordinated optimization scheduling framework of EHN and building in the park;

S2, based on the coordinated optimization scheduling framework, constructing an optimal thermal power flow scheduling model of EHN, and constructing a building model to simulate thermal characteristics and energy consumption of the building;

S3, based on the optimal thermal power flow scheduling model and the building model, taking the lowest operation cost of EHN and the lowest heat consumption of building user as a goal, constructing a collaborative optimization model of EHN and building user;

S4, outputting a collaborative optimization scheme of the optimal thermal power flow scheduling of the EHN and the heat consumption of the building user through the collaborative optimization model of EHN and building user;

This embodiment provides a collaborative optimization method for EHN and building user in the park based on the consideration of multi-taste energy cascade utilization. It can be applied to the actual business scenario of collaborative optimization management of the EHN and participation in load demand management. The method includes the following steps:

S1, establishing a coordinated optimization scheduling framework of EHN and building in the park;

S2, constructing an optimal thermal power flow scheduling model including the combined heat and power (CHP) unit, the heat exchange station and the heat pump; constructing a building model to simulate the thermal characteristics and energy consumption of the building, exemplarily, using the thermal resistance-heat capacity (R-C) network to model the thermal characteristics of the building, so as to further consider the thermal inertia of the building and the autonomous adjustment of the radiator.

S3, from the perspective of EHN, minimizing the operation cost of EHN and the heat cost of building user while meeting the heat load.

S4, from the perspective of user, adjusting the heating amount by using the electric control valve, so as to meet the individual needs of the user and reduce the user's heat cost.

Figure 2:
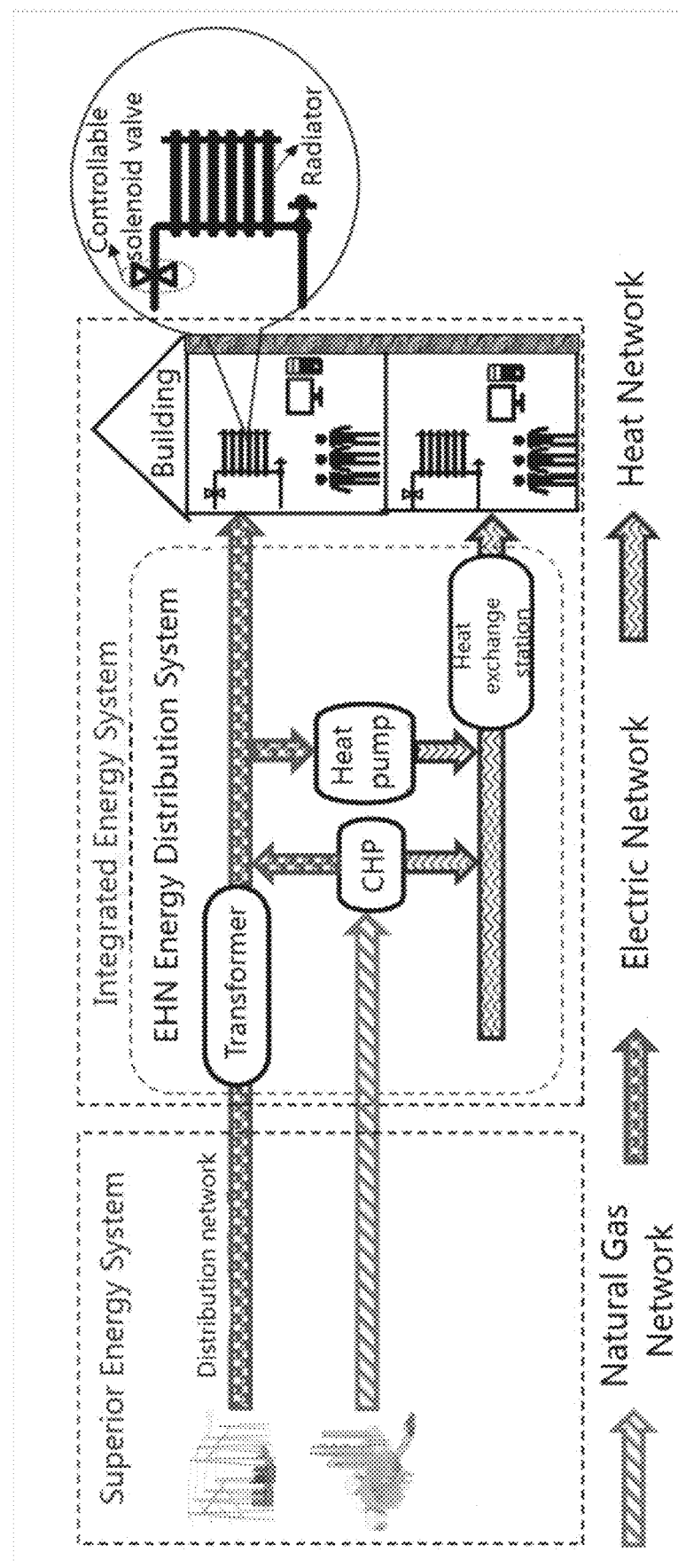
FIG. 2 is an integrated schematic diagram of EHN and building user in the park in this embodiment.

FIG. 2 shows the coordinated optimization scheduling framework of EHN and building in the park. Wherein it shows energy production and conversion equipment: heat pump and CHP unit are connected to the distribution network, heating distribution network and natural gas distribution network, so as to jointly provide electricity and heat loads for multi-energy system.

Specifically, the optimal thermal power flow scheduling model includes the hydraulic model, the thermal model, the heat exchanger model, the radiator model and the capacity and energy conversion equipment model.

The constraints of the hydraulic model include the node net flow constraint and the head loss constraint.

The constraints of the thermal model include the node flow conservation constraint, the pipeline heat dissipation constraint, and the energy conservation constraint of heat source and load.

The constraint of the heat exchanger model include the heat balance constraint of the heat exchanger;

The constraints of the radiator model include the heat constraint released by the radiator;

The constraints of the capacity and energy conversion equipment model include energy conversion constraints of CHP unit and heat pump.

Specifically, the constraints of the building model include the heat balance constraint of the wall in the heating zone of the building and the heat balance constraint of the indoor air in the heating zone of the building.

In this embodiment, the mathematical model of the collaborative optimization problem between the EHN and the building user in the park considering the multi-taste energy cascade utilization includes five parts: the hydraulic model, the thermal model, the heat exchanger model, the radiator model, the capacity and energy conversion equipment model:

The constraints of the hydraulic model:

The hydraulic model includes the node net flow equation and the head loss equation.

The node net flow is according to the energy conservation law, each heating network node satisfies the following rules:

$$m_q = \Sigma m_{in} - \Sigma m_{out} \quad (1);$$

Wherein $m_{in}$ and $m_{out}$ represent the pipeline flow entering and flowing out of the Heating Network respectively, $m_q$ is the node net flow in the Heating Network.

The node net flow equation of the hydraulic model can be obtained from Equation (1):

$$A\dot{m} = \dot{m}_q \quad (2);$$

Wherein m is the pipeline flow in the Heating Network, $\dot{m}$ represents the matrix of m, $\dot{m}_q$ represents the matrix of $m_q$, and A is the correlation matrix of the node and the pipeline, the element is defined as:

$$\begin{cases} +1, & \text{The flow direction is from the pipeline to the node.} \\ -1, & \text{The flow direction is from the node to the pipeline.} \\ 0, & \text{There is no connection between the node and the piepline.} \end{cases} \quad (3)$$

(2) The pressure change per unit distance caused by pipeline friction is called head loss, the circulating pressure equation represents the sum of the head loss of the network loop, and the sum of the circulating pressure in the entire network is zero:

$$\Sigma h_f = 0 \quad (4);$$

Wherein $h_f$ is the pipeline pressure loss scalar in the loop.

$$h_f = Km|m| \quad (5);$$

Wherein K is the resistance coefficient of the network pipeline, which is mainly determined by the pipeline diameter.

$$K = \frac{8Lf}{D^5 \rho^2 \pi^2 g}; \quad (6)$$

Wherein L is the pipeline length, D is the pipeline diameter, ρ is the water density, g is the acceleration of gravity, f is the friction coefficient, which is determined according to the Reynolds number.

From Equation (4) and Equation (5), the head loss equation in the hydraulic model is obtained:

$$Bh_f = BKm|m| = 0 \quad (7);$$

Wherein $h_f$ represents the head pressure loss vector; B is the correlation matrix of the loop and the branch, and the element of the B is defined as:

$$\begin{cases} +1, & \text{The branch direction is the same as the loop definition direction.} \\ -1, & \text{The branch flow direction is opposite to the loop definition direction.} \\ 0, & \text{The branch does not belong to the loop.} \end{cases} \quad (8)$$

The constraints of the thermal model:

(1) Node Flow Conservation:

If the flow of multiple pipelines flows into the same node, the node temperature is the mixing temperature $T_j^{out}$ of the injected flow of each pipeline.

According to the energy conservation law, the outlet temperature of water supply/backwater at any node multiplied by the total outlet flow must be equal to the sum of the product of all inlet temperatures and corresponding flows:

$$\Sigma_{i:i \to j} m_{ij} T_{ij}^{in} = (\Sigma_{j:j \to k} m_{jk}) T_j^{out} \quad (9);$$

As shown in Equation (9), for any node j, i represents different inlets to the node j, and k represents different outlets to the node j. In the Equation (9), $T_j^{out}$ is the water supply (backwater) temperature at the outlet of the node, $m_{ij}$ is the pipeline flow of the node i into the node j, $m_{jk}$ represents the pipeline flow of the node j into the node k, and $T_{ij}^{in}$ is the water supply (backwater) temperature at the node inlet, the number of node inlets is determined by the topology of the Heat Pipeline Network. The inlet temperature of the node is transported from the previous node i, and the water has experienced loss between the pipeline section i→j.

(2) Pipeline Heat Dissipation:

The Heat Pipeline Network will dissipate heat to the surrounding environment during transmission, the temperature loss is related to the ambient temperature, heat transfer coefficient and other factors, for the pipeline between any nodes i→j:

$$T_{ij}^{out} = (T_{ij}^{in} - T^a) e^{-\frac{\lambda_{ij} L_{ij}}{c_p m_{ij}}} + T^a; \quad (10)$$

Wherein $T_{ij}^{in}$ and $T_{ij}^{out}$ represent the temperature of the first and last nodes of the pipeline, $T^a$ is the external ambient temperature, $\lambda_{ij}$ is the heat transfer coefficient of the pipeline, $c_p$ is the specific heat capacity of water, $L_{ij}$ is the pipeline length, $m_{ij}$ is the pipeline flow of the node i into the node j.

(3) Energy Conservation of Heat Source and Load:

For the heat source node and the heat load node, the heat capacity/heat load need to establish an energy conservation constraint with the temperature difference between the water supply and backwater, as shown in Equation (11) and Equation (12):

$$H_i^{Source} = c_p m_i (T_i^s - T_i^r) \quad (11);$$

$$H_j^{Load} = c_p m_j (T_j^s - T_j^r) \quad (12);$$

In the equation, $H_i^{Source}$ is the output of the heat source node, $H_j^{Load}$ represents the consumption load of the load node, and mi is the pipeline flow directly connected to the heat source; $m_j$ is the pipeline flow directly connected to the direct load; $T_i^s$ is the water supply temperature of the Heating Network of heat source node; $T_j^s$ is the backwater temperature of the Heating Network of the heat source node; $T_j^s$ is the water supply temperature of the Heating Network of the heat load node; $T_j^r$ is the backwater temperature of the Heating Network of the heat load node;

The constraints of the heat exchanger model:

The water supply temperature of the secondary side pipeline network of the heat exchanger can be obtained according to the heat balance equation of the heat exchanger:

$$c_p G_1 (T_{g1} - T_{h1}) = c_p G_2 (T_{g2} - T_{h2}) + c_p G_2 \frac{dT_{g2}}{dt}; \quad (13)$$

In the equation, $c_p$ is the specific heat capacity of water; $G_1$ is the primary side flow of heat exchanger; $T_{g1}$ is the primary side water supply temperature; $T_{h1}$ is the primary side backwater temperature; $G_2$ is the secondary side flow of the heat exchanger; $T_{g2}$ is the secondary side water supply temperature; $T_{h2}$ is the secondary side backwater temperature, and t represents the time of water temperature change.

The primary side water supply temperature of the heat exchanger can be obtained by Equation (14):

$$H_{load} = c_p G_1 \cdot (T_{g1} - T_{h1}) \quad (14);$$

$H_{load}$ represents the primary side heat supply of the water heater;

The constraints of the radiator model:

There is the following relationship between indoor temperature $T_r$ and average temperature $T_p$ of heating radiator:

$$Q = aF \cdot \beta \cdot (T_p - T_r)^{1+b} \quad (15);$$

In the equation, Q is the heat released by the radiator, a, b, β, F are the radiator's own parameters.

The average temperature transmitted by the secondary pipeline network:

$$T_p = (T_{g2} + T_{h2})/2 \quad T_{g2}/T_{g1} \le 1.7 \quad (16)$$
$$T_p = \frac{T_{g2} - T_{h2}}{\ln \frac{T_{g2} - T_{h2}}{T_{h2} - T_r}} \quad T_{g2}/T_{g1} > 1.7;$$

The relative flow is used to characterize the action of the control valve, which can be expressed as:

$$\overline{G_2} = \frac{Q_2}{Q_{2s}} \cdot \frac{T_{g2s} - T_{h2s}}{T_{g2} - T_{h2}}; \quad (17)$$

$Q_2$ is the actual heat load of the user; $Q_{2s}$ is the design heat load of the user; $T_{g2s}$ is the design water supply temperature of the user; $T_{h2s}$ is the design backwater temperature of the user;

The constraints of the building user model:

The relationship between the outdoor temperature, the thermal gain of the heating zone and the wall temperature can be expressed by the Resistor-Capacitor (RC) model of the node with wall and heating zone. The heat balance Equation of the wall in the heating zone is:

$$\begin{cases} C_{1,2}^w \dfrac{dT_{1,2}^w}{dt} = \dfrac{T_1 T_{1,2}^w}{R_{1,2}^w} + \dfrac{T_2 - T_{1,2}^w}{R_{1,2}^w} \\ \quad + r_{1,2} \alpha_{1,2} A_{1,2}^w Q_{1,2}^{rad} \\ C_{1,3}^w \dfrac{dT_{1,3}^w}{dt} = \dfrac{T_1 T_{1,3}^w}{R_{1,3}^w} + \dfrac{T_3 - T_{1,3}^w}{R_{1,3}^w} \\ \quad + r_{1,3} \alpha_{1,3} A_{1,3}^w Q_{1,3}^{rad} \\ C_{1,4}^w \dfrac{dT_{1,4}^w}{dt} = \dfrac{T_1 T_{1,4}^w}{R_{1,4}^w} + \dfrac{T_4 - T_{1,4}^w}{R_{1,4}^w} \\ \quad + r_{1,4} \alpha_{1,4} A_{1,4}^w Q_{1,4}^{rad} \\ C_{1,5}^w \dfrac{dT_{1,5}^w}{dt} = \dfrac{T_1 T_{1,5}^w}{R_{1,5}^w} + \dfrac{T_5 - T_{1,5}^w}{R_{1,5}^w} \\ \quad + r_{1,5} \alpha_{1,5} A_{1,5}^w Q_{1,5}^{rad} \end{cases} \quad (18)$$

Wherein $T_{1,2}^w$, $T_{1,3}^w$, are the temperatures of the four wall nodes, indicating that the temperature of the wall around the area; $T_1$ is the node temperature of the heating zone, which represents the indoor temperature of the heating zone, $T_2 \sim T_5$ is the temperature of the adjacent heating zone or the outdoor temperature. $r_{1,2}$ is taken 1 when the wall or roof is exposed to sunlight, otherwise 0; $\alpha_{1,2}$ represents the heat absorption rate of the wall, $A_{1,2}^w$ represents the surface area of the wall, and $Q_{1,2}^{rad}$ is the light intensity corresponding to the wall in the corresponding direction.

The heat balance of indoor air in the heating zone can be expressed as:

$$C_1^r \dfrac{dT_1^r}{dt} = \quad (19)$$

$$\sum_{j=2}^{5} \dfrac{T_{1,j}^w - T_1^r}{R_{1,j}^w} + \sum \dfrac{T^{out} - T_1^r}{R_{1,j}^{win}} + Q_1^{load} + Q_1^{int} + \tau_{1,j}^{win} A_{1,j}^{win} Q_1^{win};$$

$C_1^r$ represents the specific heat capacity of the room air, $T_1^r$ represents the indoor temperature of the room, $T_{1,j}^w$ represents the corresponding wall temperature, $T^{out}$ represents the outdoor ambient temperature, $R_{1,j}^w$ represents the thermal resistance of the wall, $R_{1,j}^{win}$ represents the thermal resistance of the window, $Q_1^{load}$ represents the indoor thermal load, $Q_1^{int}$ represents the indoor internal heat gain, such as heat dissipation of human body, heat dissipation of electrical appliance, etc., $\tau_{1,j}^{win}$ represents the light transmittance of the window, $A_{1,j}^{win}$ represents the surface area of the window, and $Q_1^{win}$ represents the light intensity accepted by the window.

The constraints of the capacity and energy conversion equipment model:

EHN purchases electricity and natural gas from the superior Electric Network and Natural Gas Pipeline Network, and produces electricity and heat to supply building user through CHP unit and heat pump. Wherein the purchased natural gas is used for CHP, and the purchased electricity and part of the electricity produced by CHP are used for heat pump. There is energy conversion efficiency between CHP unit and heat pump.

$$P_{chp} = \eta_e P_e \quad (20);$$

$$H_{chp} = \eta_h P_g \quad (21);$$

$$H_{hp} = \eta_{hp} P_{hp} \quad (22);$$

The unit capacity is related to energy consumption and production efficiency. $P_e$ is the purchase of electricity of EHN (kW) per hour, $P_g$ is the purchase of natural gas of EHN (kW) per hour; $P_{chp}$ and $H_{chp}$ are the electricity and heat produced by the CHP unit per hour, $H_{hp}$ is the heat output by the heat pump unit (kW) per hour; $\eta_e$ and $\eta_h$ are efficiency of producing the electricity and the heat of the CHP unit, and $\eta_{hp}$ is the efficiency of outputting the heat of the heat pump unit $P_{hp}$ is the electricity consumed by the heat pump per hour.

Specifically, in the collaborative optimization model of EHN and building user, the constraints corresponding to the goal of the lowest operating cost of EHN include: the electricity balance constraint, the heat balance constraint, the energy purchase constraint and the node water temperature constraint.

Specifically, in the collaborative optimization model of EHN and building user, the constraints corresponding to the goal of the lowest heat consumption of building user include: the user strategy constraint and the radiator property constraint.

From the perspective of EHN, this embodiment further minimizes the operating cost of EHN while satisfying the heat load:

The objective function (the economic cost of EHN is composed of the cost of the electricity purchased from the superior Electric Network and the cost of natural gas purchased from the Natural Gas Pipeline Network) is:

$$F(t) = \min \Sigma_t (C_{e,t} P_e + C_{g,t} P_g) \quad (23);$$

Wherein $C_{e,t}$ and $C_{g,t}$ represent the price of electricity and natural gas at time t, $P_e$ and $P_g$ represent the purchase (kW) of electricity and natural gas of EHN per hour.

The constraints (for any time t, there are the following constraints):

Electricity balance:

$$P_e + P_{chp} = P_{hp} + P_{load} \quad (24)$$

$$P_{chp} = \eta_e P_g;$$

Heat balance:

$$H_{chp} + H_{hp} = H_{load} \quad (25)$$

$$H_{chp} = \eta_h P_g$$

$$H_{hp} = \eta_{hp} P_{hp};$$

The restriction of energy purchase:

$$0 \leq P_{hp} \leq P_{hp}^{max} \quad (26);$$

$$0 \leq P_e \leq P_{hp}^{max}$$

$$0 \leq P_g \leq P_{chp}^{max}/\eta_e \quad (27);$$

$$P_{chp} \leq P_{load} \quad (28);$$

The restriction of the node water temperature:

$$T_s^{min} \leq T_{s,i} \leq T_s^{max} \quad (29);$$

$$T_r^{min} \leq T_{r,i} \leq T_r^{max} \quad (30);$$

In the equation, $T_s^{min}$ is the minimum value of the node water supply temperature; $T_{s,i}$ is the node water supply temperature; $T_s^{max}$ is the maximum value of the node water supply temperature; $T_r^{min}$ is the minimum value of the node backwater temperature; $T_{r,i}$ is the node supply water temperature; $T_r^{max}$ is the maximum value of the node backwater temperature.

From the perspective of user, the heating volume is adjusted through the electric control valve to meet the individual needs of the user and reduce the heat cost of the user:

The objective function (the goal of the heating consumer is to minimize the heating consumption under satisfying the heating temperature demand required by the user):

$$F(t) = \min\left(\sum_{t=1}^{24} Q_t^{load} \cdot \Delta t\right); \quad (31)$$

$Q_t^{load}$ represents the heat load of heating consumer; in this embodiment, the scheduling time $\Delta t$ is 1h, assuming that the heat price sold by EHN is unchanged.

The constraints include:
The user strategy constraint:

$$T_t^r = T_t^{adj}, \forall t \quad (35);$$

In the equation, $T_t^r$ represents the indoor temperature at time t, $T_t^{adj}$ represents the indoor temperature of adjacent room at time t.

The radiator property constraint $$0 \leq \overline{G_2} \leq 1 \quad (36);$$

$$T_{min} \leq T_{h2} \leq T_{h2,s} \quad (37);$$

In the equation, $T_{min}$ represents the minimum temperature of the secondary side backwater temperature of the radiator;

In the above Equation, the subscript t represents the variable at time t, and the subscript t+1 represents the variable at time t+1. Therefore, when setting the constraint of the optimization problem, it is necessary to set the initial condition and then iterate to obtain the 24-hour constraint.

Figure 3:
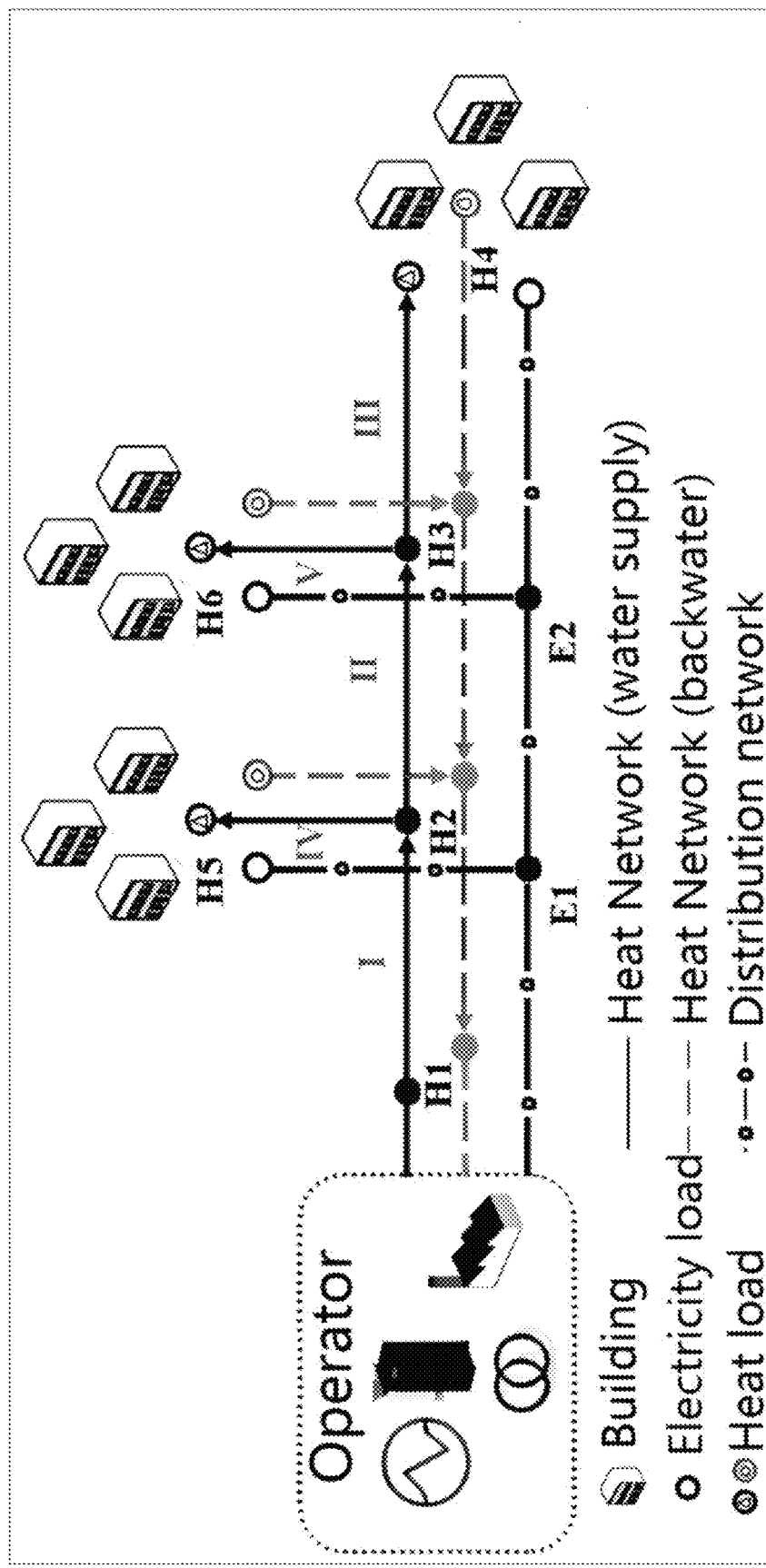
FIG. 3 is a schematic diagram of the coordinated optimization embodiment of EHN and building user in the park in this embodiment.

In order to illustrate the application of the invention in the actual business scenario such as the EHN and the optimal management of building user in the park, this embodiment provides a test example that uses the present invention. The test example is shown in FIG. 3, wherein H1 is the heat source node, nodes H2 and H3 have backwater mixing, nodes H4, H5 and H6 have heat and electricity loads, and a heat exchanger is installed at the load node. The Roman numerals I to V indicate the pipeline numbers of the Heat Pipeline Network. The pipeline I connects the heat source, and the pipelines IV and V have loads.

The remaining parameters of the building and EHN are shown in Table 1 to Table 8.

TABLE 1

Operating parameters of CHP unit.

| Maximum heat capacity $H_{chp}^{max}$ | Maximum electricity capacity $P_{chp}^{max}$ | Heat production efficiency $\eta_h$ | Electricity production efficiency $\eta_e$ | Rated power |
|---|---|---|---|---|
| 8 MW | 6 MW | 0.4 | 0.3 | 20 MW |

TABLE 2

Operating parameters of four heat pump units.

| Maximum heat capacity $H_{hp}^{max}$ | Single rated power | Efficiency of heat pump $\eta_{hp}$ |
|---|---|---|
| 6.08 MW | 380 kW | 4 |

TABLE 3

Parameters of Heat Pipeline Network.

| The labels of the pipelines | The first node | The last node | Length (m) | Diameter (m) | Roughness | Flow (kg/h) | The heat transfer coefficient |
|---|---|---|---|---|---|---|---|
| I | 1 | 2 | 1000 | 0.8 | 0.0005 | 55.059524 | 0.12 |
| II | 2 | 3 | 1000 | 0.8 | 0.0005 | 33.041667 | 0.12 |
| III | 3 | 4 | 1000 | 0.8 | 0.0005 | 14.684524 | 0.12 |
| IV | 2 | 5 | 800 | 0.8 | 0.0005 | 22.02381 | 0.12 |
| V | 3 | 6 | 800 | 0.8 | 0.0005 | 18.357143 | 0.12 |

TABLE 4

Node parameters of the Heat Network.

| Node parameters | Minimum water supply temperature | Maximum water supply temperature | Minimum backwater temperature | Maximum backwater temperature |
|---|---|---|---|---|
| Values | 70° C. | 100° C. | 40° C. | 60° C. |

TABLE 5

Connected load number of EHN nodes.

| EHN nodes | E1, H5 | E2, H6 | E2, H4 |
|---|---|---|---|
| Number of connected buildings | 12 | 10 | 8 |

TABLE 6

Thermal resistance parameters of building R-C model

| Thermal resistance of Wall 1 $R_1^w$ (K/W) | Thermal resistance of Wall 2 $R_2^w$ (K/W) | Thermal resistance of Wall 3 $R_3^w$ (K/W) | Thermal resistance of Wall 4 $R_4^w$ (K/W) | Thermal resistance of window $R^{win}$ (K/W) |
|---|---|---|---|---|
| 0.06 | 0.08 | 0.06 | 0.06 | 0.02 |

TABLE 7

Heat capacity parameters of building R-C model.

| Heat capacity of Wall 1 $C_1^w$ (J/K) | Heat capacity of Wall 2 $C_2^w$ (J/K) | Heat capacity of Wall 3 $C_3^w$ (J/K) | Heat capacity of Wall 4 $C_4^w$ (J/K) | Heat capacity of room $C^r$ (J/K) |
|---|---|---|---|---|
| 79000 | 2600000 | 79000 | 79000 | 25000 |

TABLE 8

Other parameters of the building.

| Surface of the window $A^{win}(m^2)$ | Surface of the wall $A^{wall}(m^2)$ | Surface area of the radiator $K(m^2)$ | The set target temperature $T_{adj}(°C.)$ |
|---|---|---|---|
| 4 | 24 | 10 | 22 |

Figure 4:
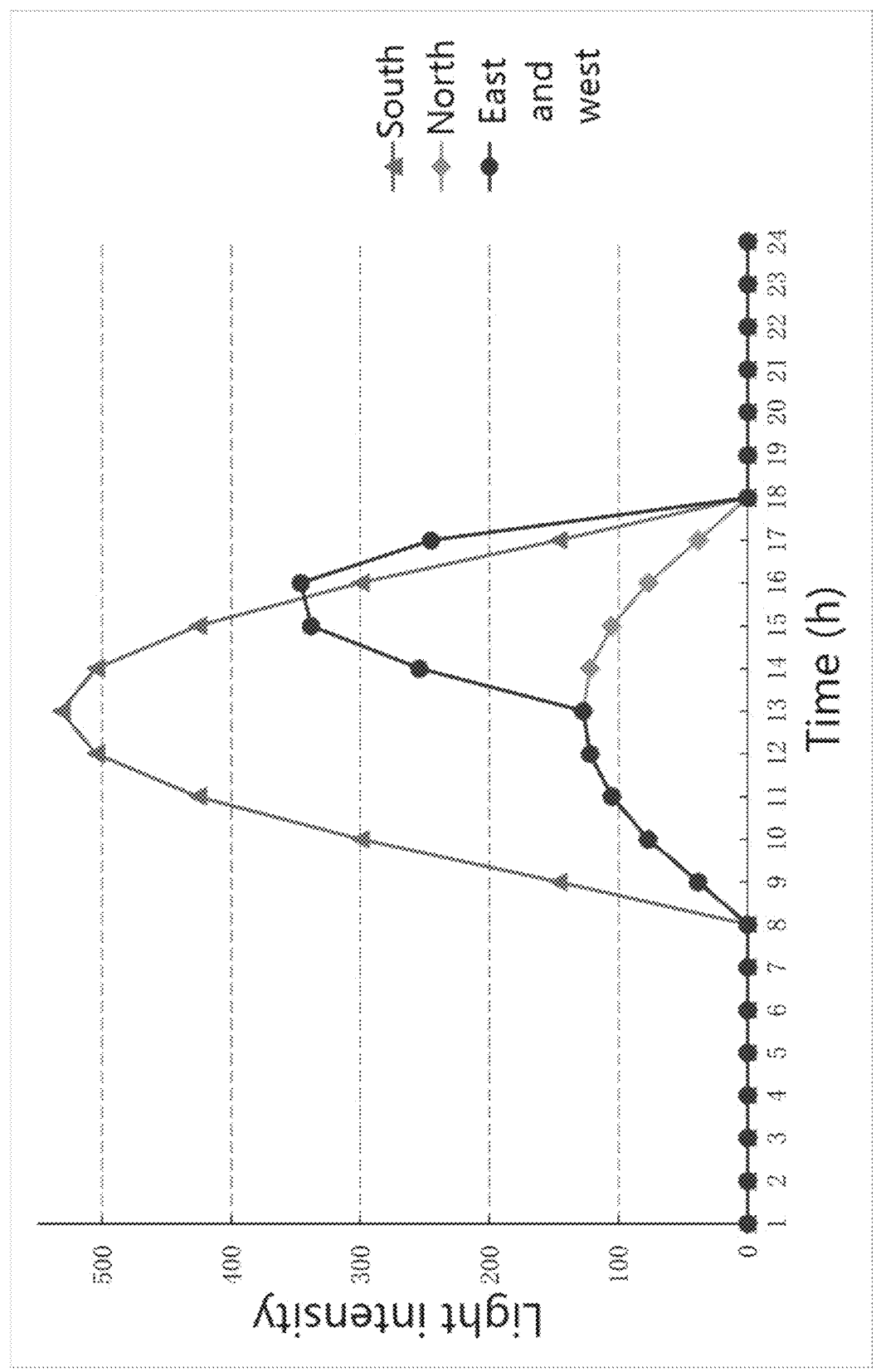
FIG. 4 is a schematic diagram of the four-direction light intensity change of the building in the typical day in this embodiment.

The environmental parameters are shown in FIG. 4, the light intensity changes on the east and west sides of the building in a typical day are consistent. Therefore, the indicator lines on the east and west sides are used in FIG. 4 to describe the light intensity changes in the east and west directions.

Figure 5:
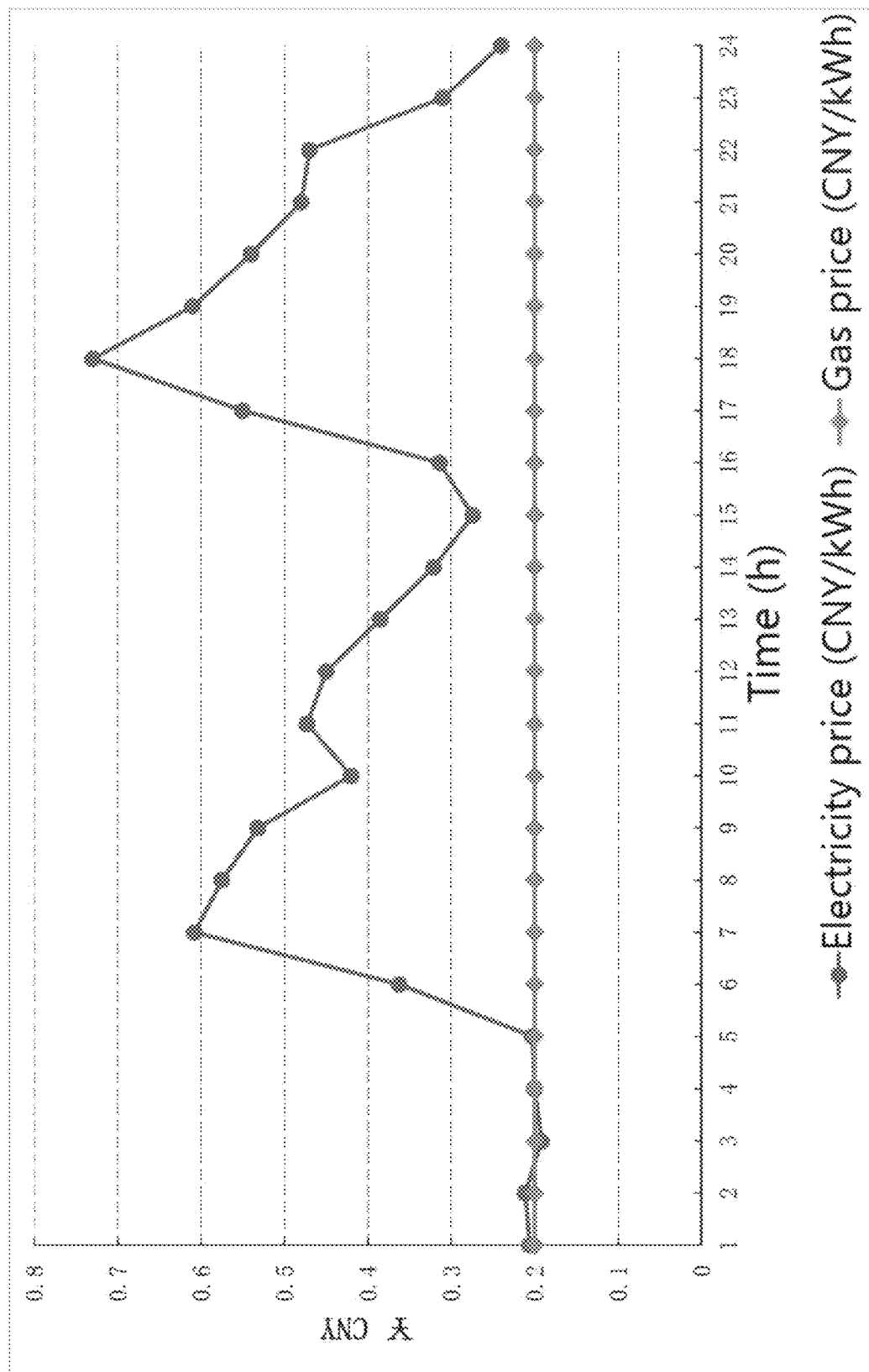
FIG. 5 is a schematic diagram of energy price change in the typical day in this embodiment.
Figure 6:
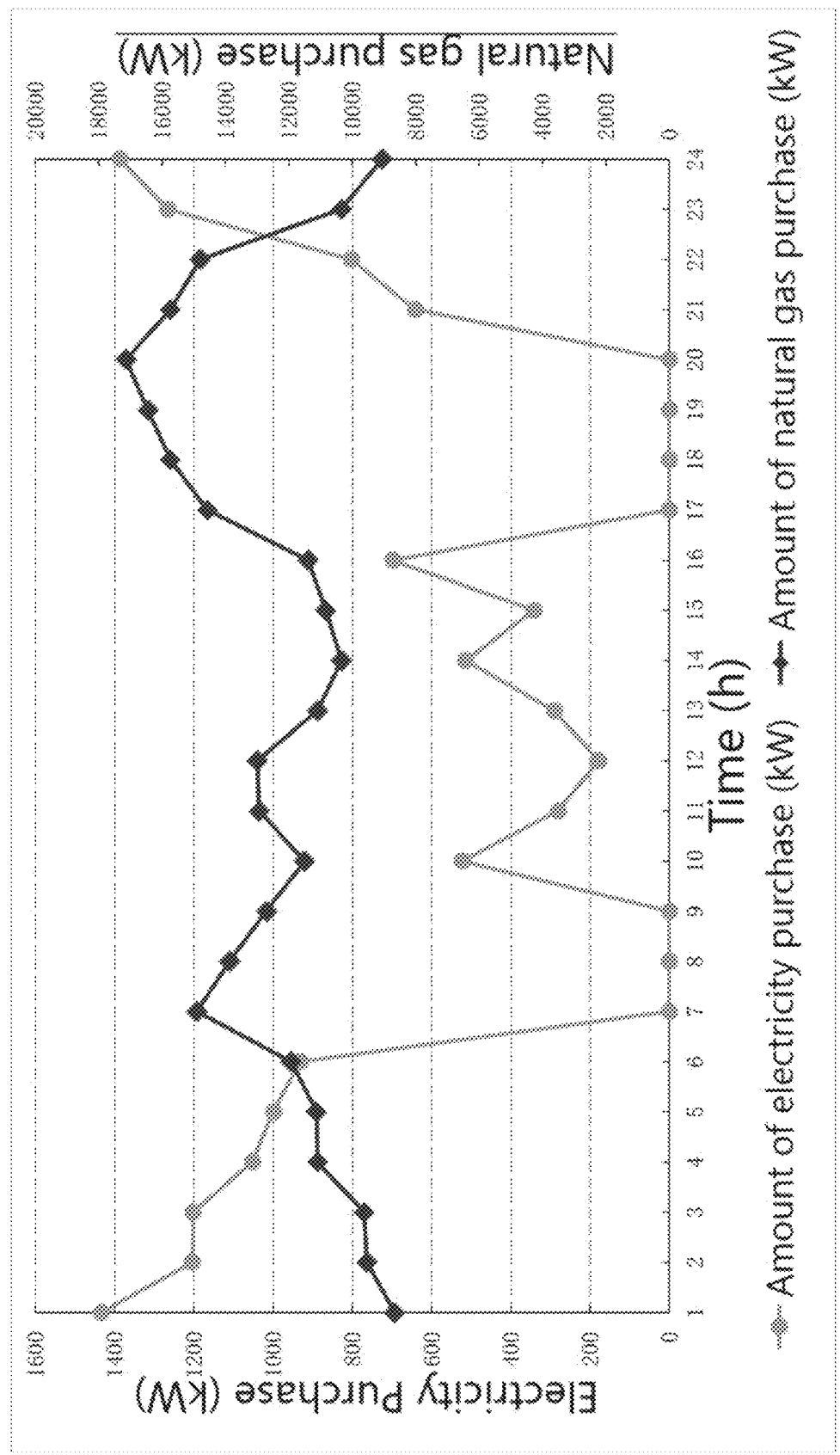
FIG. 6 is a schematic diagram of the electricity and natural gas purchases of EHN in the typical day in this embodiment.

From the perspective of EHN, when meeting the heat load and further minimizing the operating cost of EHN, the optimization result show that:

From FIG. 5 and FIG. 6, when the electricity price is high, the purchase of electricity of EHN is significantly reduced, and no electricity is purchased during the peak period of electricity price, and the corresponding purchase of gas is significantly increased. Due to the high heat load at night and the low relative electricity price, the use of high-efficiency heat pump as the main heat source can not only save cost, but also consume the excess electricity produced by the CHP unit.

Most of the electricity purchased and produced is used for the user's electricity load consumption, and a small part drives the heat pump to produce heat. Due to the high day-to-day electricity price and the constant natural gas price, most of the electricity consumption comes from the electricity produced by CHP unit rather than from direct purchase. Thanks to the high efficiency of the heat pump, the electricity consumed by the heat pump is very small compared with the whole. During the nighttime when the electricity price is reduced, the electricity consumption of the heat pump increases significantly, EHN will tend to use the heat pump as the main source of heat production at night.

Figure 7:
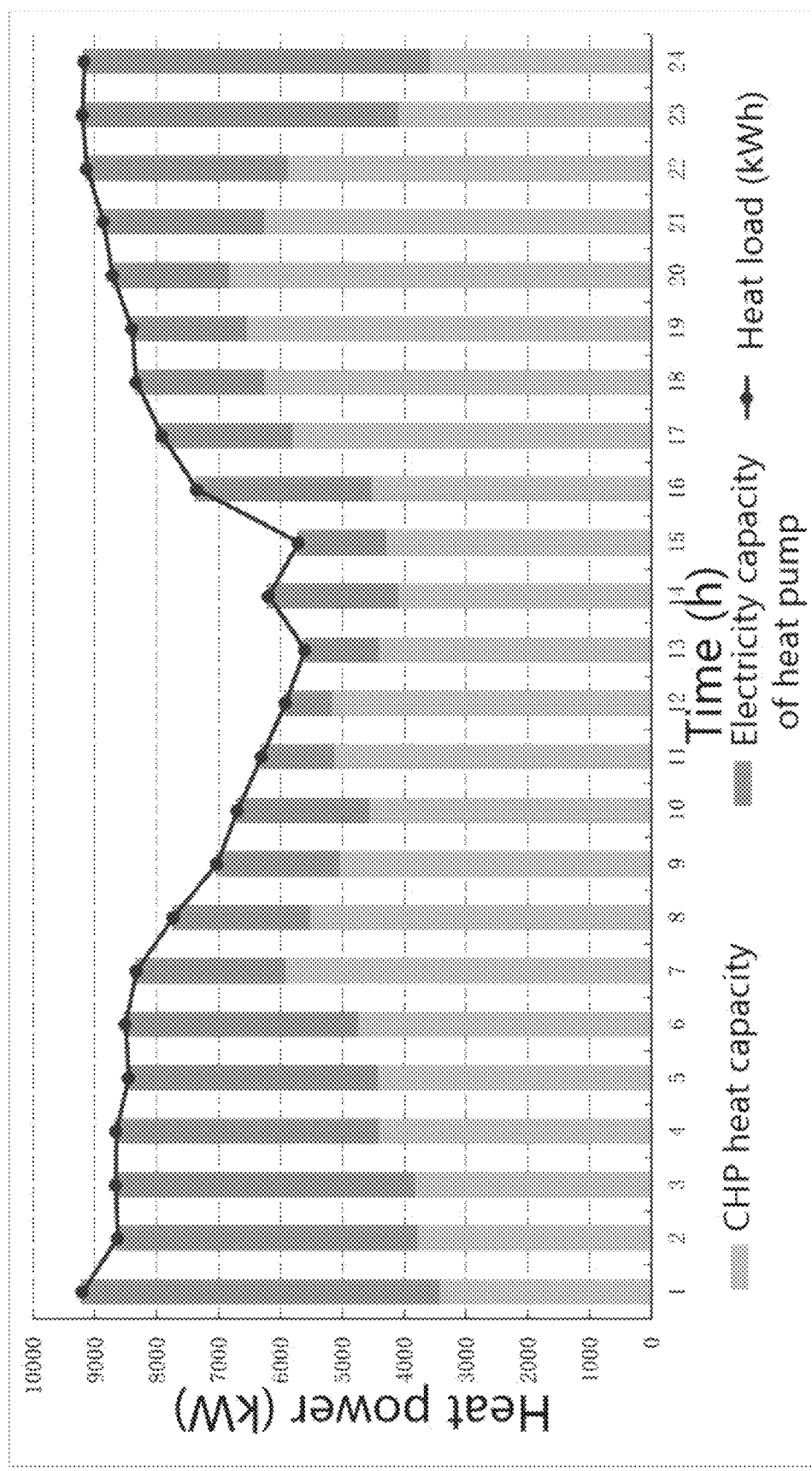
FIG. 7 is a schematic diagram of the relationship between the heat capacity and load of different equipment in this embodiment.

It can be seen from FIG. 7 that in the low electricity price stage, the capacity of the heat pump accounts for more than half of the total. In the peak stage of the electricity price, the capacity of the heat pump is significantly lower than that of the CHP unit. EHN will tend to choose to use relatively cheap natural gas to generate heat through the CHP unit. The period when the heat pump capacity decreases is also the day when the user's heat load is low, but in general, the heat capacity distribution is less affected by the user's heat load.

When the EHN operator's minimum cost of purchasing electricity and natural gas is the optimal goal, the total scheduling cost of the energy station operator is shown in Table 9.

TABLE 9

Optimal scheduling total cost.

| EHN equipment | Total scheduling cost (¥/day) |
|---|---|
| 1 CHP and 4 heat pumps | 63645.9 |

Figure 8:
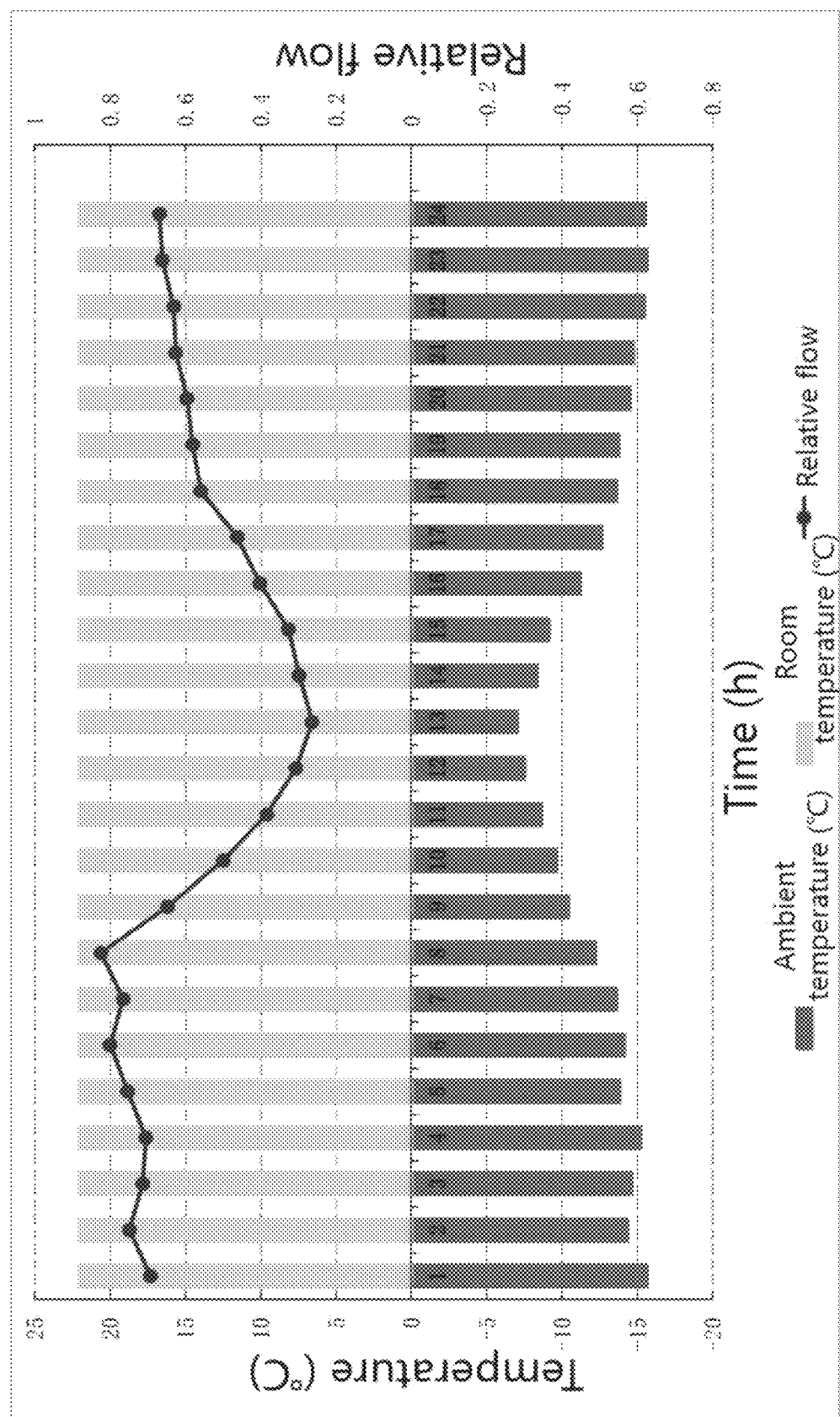
FIG. 8 is a schematic diagram of the indoor and outdoor temperature and the relative flow of the radiator in Scenario I in this embodiment.

From the perspective of user, the heating volume is adjusted by the electric control valve to meet the individual needs of the user and reduce the heat cost of the user. The optimization results of Scenario I with fixed room temperature and Scenario II with unfixed room temperature show that:

In Scenario I, considering the needs of a single user's room, it is set to keep the indoor temperature constant at 22° C. The relative flow of the radiator is shown in FIG. 8, in the daytime, the temperature difference between indoor and outdoor is lower than that at night, and the relative flow of the radiator is significantly reduced. At night, the temperature difference between indoor and outdoor is large, and a large amount of heating is required, and the relative flow rate of the radiator is obviously increased. In the period near night, due to the heat in the daytime, the light outside the building decreases slowly, it can be seen that the slope of the relative flow growth of the radiator is significantly lower than the slope of the morning period.

Figure 9:
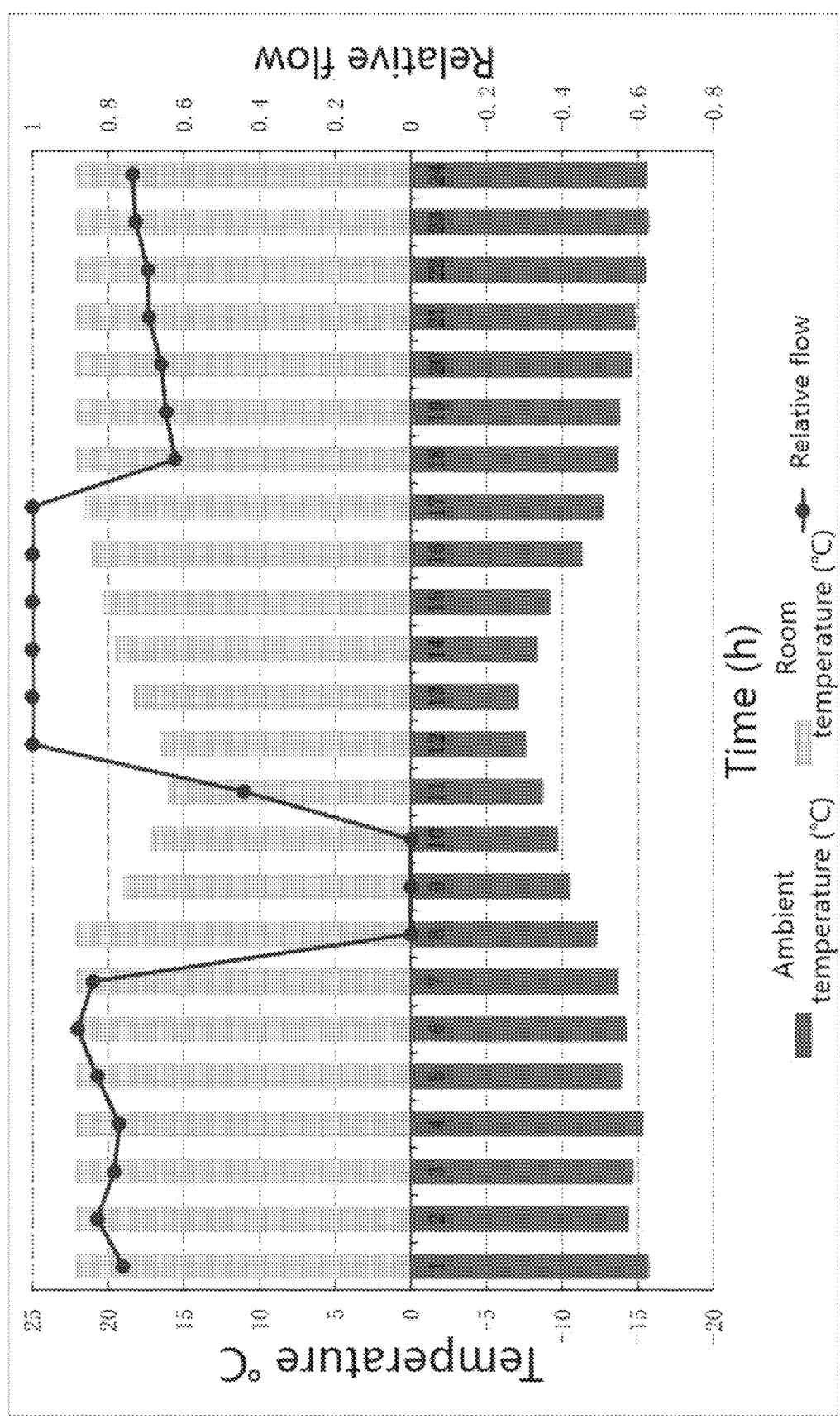
FIG. 9 is a schematic diagram of the indoor and outdoor temperature and the relative flow of the radiator in Scenario II in this embodiment.

In Scenario II, the user closes the indoor constant temperature setting of the radiator during the day from 9:00 to 17:00. During the period of closing the constant temperature control, the indoor temperature drops to 15.9° C. at 11:00. The relative flow of the radiator is shown in FIG. 9, Scenario II can reduce the relative flow of the radiator to 0 when there is no heating demand during the day, that is, the radiator is in a completely non-working state. In particular, due to the upper limit of the radiator's radiation power, in order to restore a constant room temperature of 22° C.s after 17:00, the radiator needs to work at full load for more than 6 hours during the daytime without heating.

Comparing the total heat consumption of the user's room in a day under different scenarios, that is, the sum of the heat supply of the four radiators, the results are shown in Table 10. The heat consumption generated by the user's manual adjustment is lower than the constant temperature without adjustment. It can be inferred that if the user actively adjusts the temperature more frequently, the heat consumption can be further reduced.

TABLE 10

Heat consumption of user under different heating strategies.

| Heating strategy | Total heat consumption of user (kWh/day) |
|---|---|
| Scenario I | 138.79 |
| Scenario II | 126.6061 |

From the above optimization results, it can be seen that from the perspective of EHN and building user, while meeting the heat load, the operation cost of EHN and the heat cost of building user are further reduced to the maximum extent.

Figure 10:
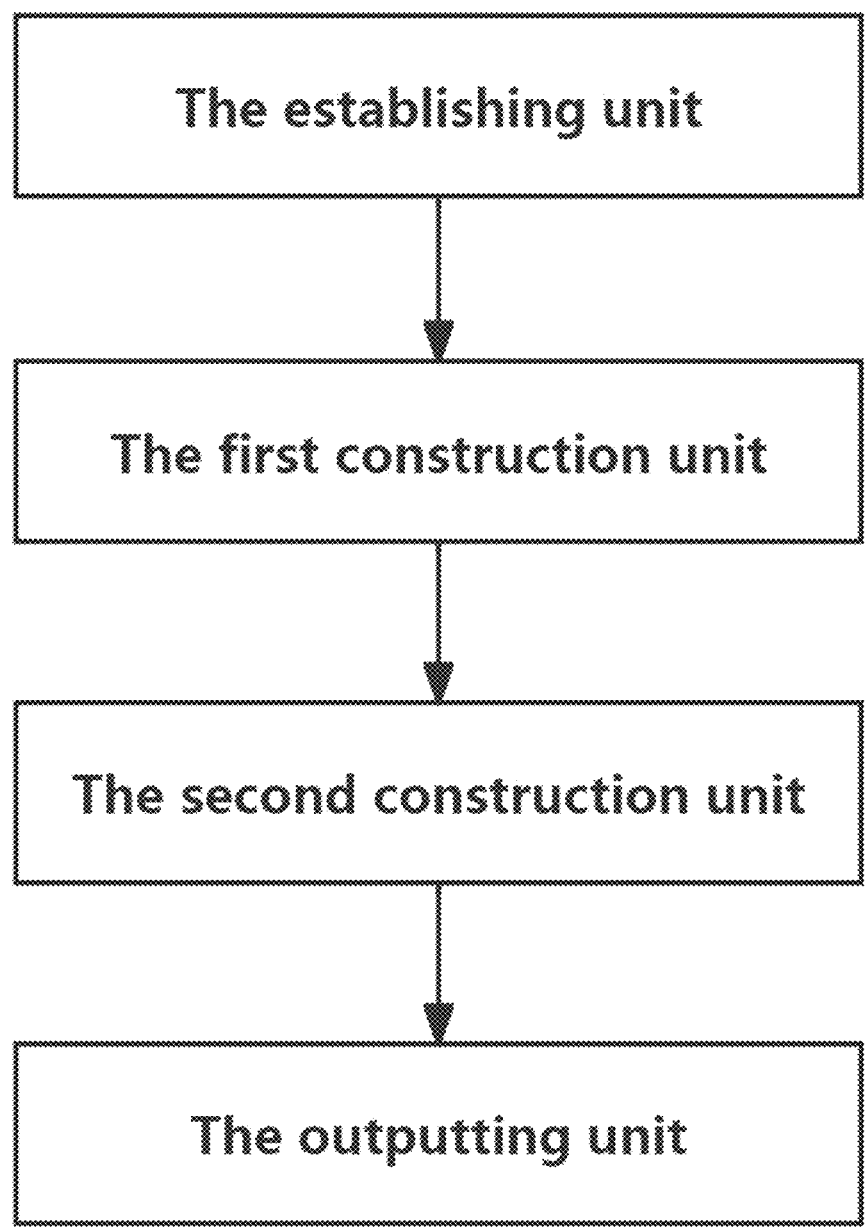
FIG. 10 is a block diagram of the collaborative optimization method of EHN and building user of this embodiment.

FIG. 10 is a block diagram of a collaborative optimization method for EHN and building user in this patent. As shown in FIG. 10, this patent provides a collaborative optimization method for EHN and building user, including:

The establishing unit 10, which is used to establish the coordinated optimization scheduling framework of EHN and building in the park;

The first construction unit 20, which is used to construct the optimal thermal power flow scheduling model of the EHN and construct the building model to simulate thermal characteristics and energy consumption of the building based on the coordinated optimization scheduling framework;

The second construction unit 30, which is used to construct the collaborative optimization model of EHN based on the optimal thermal power flow scheduling model and the building model, and taking the lowest operation cost of EHN and the lowest heat consumption of building user as the goal;

The outputting unit 40, which is used to output the collaborative optimization scheme of the optimal thermal power flow scheduling of the EHN and the heat consumption of the building user through the collaborative optimization model of EHN and building user;

Specifically, the optimal thermal power flow scheduling model includes the hydraulic model, the thermal model, the heat exchanger model, the radiator model, and the capacity and energy conversion equipment model.

The constraints of the hydraulic model include the node net flow constraint and the head loss constraint.

The constraints of the thermal model include the node flow conservation constraint, the pipeline heat dissipation constraint, and the energy conservation constraint of heat source and load.

The constraints of the heat exchanger model include the heat balance constraint of the heat exchanger;

The constraints of the radiator model include the heat constraint released by the radiator;

The constraints of the capacity and energy conversion equipment model include energy conversion constraints of the CHP unit and the heat pump.

Specifically, the constraints of the building model include the heat balance constraint of the wall in the heating zone of the building and the heat balance constraint of the indoor air in the heating zone of the building.

Specifically, in the collaborative optimization model of EHN and building user, the constraints corresponding to the goal of the lowest operating cost of EHN include: the electricity balance constraint, the heat balance constraint, the energy purchase constraint and the node water temperature constraint.

Specifically, in the collaborative optimization model of EHN and building user, the constraints corresponding to the goal of the lowest heat consumption of building user include: the user strategy constraint and the radiator property constraint.

Figure 11:
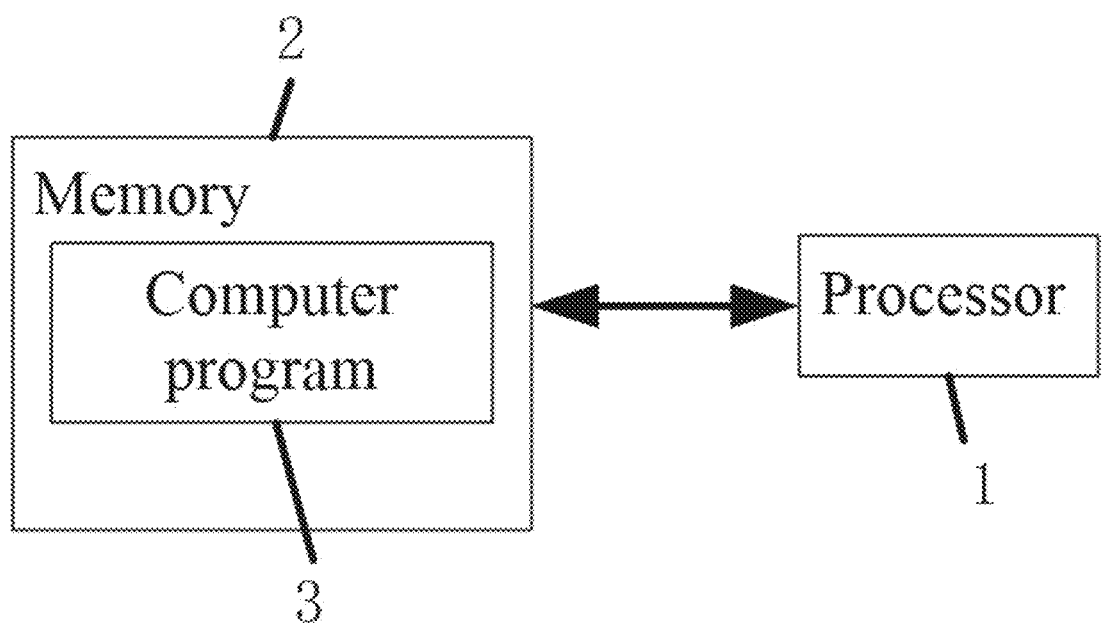
FIG. 11 is a structural diagram of the collaborative optimization equipment of EHN and building user of this embodiment.

FIG. 11 is a structural diagram of the collaborative optimization method and equipment for EHN and building user. As shown in FIG. 11, corresponding to the collaborative optimization method for EHN and building user provided above, the invention also provides a collaborative optimization equipment for EHN and building user. Since the embodiment of the equipment is similar to the embodiment of the above method, the description is relatively simple, for similar parts, please refer to the instruction in the above embodiment of the method, the equipment described below is only schematic. The equipment can include: processor 1, memory 2 and communication bus (i.e., the bus of the above equipment) and search engine, wherein processor 1 and memory 2 communicate with each other through the communication bus, and they communicate with the outside through the communication interface. Processor 1 can call the logic instruction in memory 2 to perform the collaborative optimization method for EHN and building user.

In addition, the logic instruction in the above memory 2 can be stored in a computer-readable storage medium when it can be implemented in the form of software functional unit and sold or used as an independent product. Based on this understanding, essentially, the technical scheme of the invention or the part that contributes to the existing technology or the part of the technical scheme can be reflected in the form of a software product, and this computer software product is stored in a storage medium, including a number of instructions to enable a computer device (can be a personal computer, server, or network device, etc.) to perform all or part of the steps of each embodiment method of the invention. The aforementioned storage media include: memory chip, U disk, mobile hard disk, read-only memory (ROM), random access memory (RAM), disk or optical disk and other media that can store program code.

On the other hand, the embodiment of the invention also provides a processor-readable storage medium, on which a computer program 3 is stored. When the computer program 3 is executed by processor 1, it is implemented to perform the collaborative optimization method for EHN and building user provided by the above embodiments.

The processor-readable storage medium can be available medium or data storage device that processor 1 can access, including magnetic memory (such as floppy disk, hard disk, tape, magneto-optical disk (MO)), optical memory (such as CD, DVD, BD, HVD), and semiconductor memory (such as ROM, EPROM, EEPROM, non-volatile memory (NAND-FLASH), solid-state disk (SSD)).

The above is only the preferred implementation method of this patent, the protection scope of this patent is not limited to the above embodiments. All technical solutions belonging to this patent idea belong to the protection scope of this patent. It should be pointed out that for ordinary technical personnel in this technical field, some improvements and modifications without deviating from the principle of this patent should be regarded as the protection scope of this patent.

What is claimed is:

1. A collaborative optimization method for an Electric and Heating Networks (EHN) and a building user, comprising:

establishing a coordinated optimization scheduling framework of the EHN and a building in a park;

based on the coordinated optimization scheduling framework, constructing an optimal thermal power flow scheduling model of the EHN, and constructing a building model to simulate thermal characteristics and energy consumption of the building;

based on the optimal thermal power flow scheduling model and the building model, taking a lowest operation cost of the EHN and a lowest heat consumption of the building user as a goal, constructing a collaborative optimization model of the EHN and the building user; and outputting a collaborative optimization scheme of an optimal thermal power flow scheduling of the EHN and a heat consumption of the building user through the collaborative optimization model of the EHN and the building user to a controller for controlling a heating radiator, a combined heat and power (CHP) unit and a heat pump based on the collaborative optimization scheme;

wherein the optimal thermal power flow scheduling model comprises a hydraulic model, a thermal model, a heat exchanger model, a radiator model and a capacity and energy conversion equipment model;

constraints of the hydraulic model comprise a node net flow constraint and a head loss constraint, wherein:

a node net flow is according to an energy conservation law, each heating network node satisfies following rules:

$$m_q = \Sigma m_{in} - \Sigma m_{out} \quad (1);$$

wherein $m_{in}$ and $m_{out}$ represent pipeline flow entering and flowing out of a Heating Network respectively, and $m_q$ is a node net flow in the Heating Network;

a node net flow equation of the hydraulic model is obtained from Equation (1):

$$A\dot{m} = \dot{m}_q \quad (2);$$

wherein m is a pipeline flow in the Heating Network, $\dot{m}$ represents a matrix of m, $\dot{m}_q$ represents a matrix of $m_q$, and A is a correlation matrix of a node and a pipeline, and an element is defined as:

$$\begin{cases} +1, & \text{A flow direction is from the pipeline to the node.} \\ -1, & \text{The flow direction is from the node to the pipeline.} \\ 0, & \text{There is no connection between the node and the pipeline.} \end{cases} \quad (3)$$

a pressure change per unit distance caused by pipeline friction is called head loss, a circulating pressure equation represents a sum of the head loss of a network loop, and a sum of the circulating pressure in an entire network is zero:

$$\Sigma h_f = 0 \quad (4);$$

wherein $h_f$ is a pipeline pressure loss scalar in the network loop;

$$h_f = Km|m| \quad (5);$$

wherein K is a resistance coefficient of a network pipeline, and K is mainly determined by a pipeline diameter;

$$K = \frac{8Lf}{D^5 \rho^2 \pi^2 g}; \quad (6)$$

wherein L is a pipeline length, D is the pipeline diameter, ρ is a water density, g is an acceleration of gravity, f is a friction coefficient and is determined according to Reynolds number;

from Equation (4) and Equation (5), a head loss equation in the hydraulic model is obtained:

$$Bh_f = BK\dot{m}|\dot{m}| = 0 \quad (7);$$

wherein $h_f$ represents a head pressure loss vector; B is a correlation matrix of the network loop and a branch, and an element of the B is defined as:

$$\begin{cases} +1, & \text{A branch flow direcction is the same as the loop definition direction.} \\ -1, & \text{The branch flow direction is opposite to the loop definition direction.} \\ 0, & \text{The branch does not belong to the loop.} \end{cases} \quad (8)$$

constraints of the thermal model comprise a node flow conservation constraint, a pipeline heat dissipation constraint, and an energy conservation constraint of heat source and load, wherein:

a node flow conservation:

if a flow of multiple pipelines flows into a same node, then a node temperature is a mixing temperature $T_j^{out}$ of an injected flow of each pipeline;

according to the energy conservation law, an outlet temperature of water supply/backwater at any node multiplied by a total outlet flow is equal to a sum of a product of all inlet temperatures and corresponding flows:

$$T_{i:i \to j} m_{ij} T_{ij}^{in} = (\Sigma_{j:j \to k} m_{jk}) T_j^{out} \quad (9);$$

as shown in Equation (9), for any node j, i represents different inlets to the node j, and k represents different outlets to the node j, in the Equation (9), $T_j^{out}$ is a water supply (backwater) temperature at a node outlet, $m_{ij}$ is the pipeline flow of the node i into the node j, $m_{jk}$ represents the pipeline flow of the node j into the node k, and $T_{ij}^{in}$ is the water supply (backwater) temperature at the node inlet, a number of node inlets is determined by a topology of a Heat Pipeline Network; an inlet temperature of the node is transported from a previous node i, and the water has experienced loss between a pipeline section i→j;

a pipeline heat dissipation:

the Heat Pipeline Network dissipates heat to a surrounding environment during transmission, a temperature loss is related to an ambient temperature, a heat transfer coefficient and other factors, for the pipeline between any nodes i→j:

$$T_{ij}^{out} = (T_{ij}^{in} - T^a) e^{-\frac{\lambda_{ij} L_{ij}}{c_p m_{ij}}} + T^a; \quad (10)$$

wherein $T_{ij}^{in}$ and $T_{ij}^{out}$ represent temperatures of first and last nodes of the pipeline, $T^a$ is an external ambient temperature, $\lambda_{ij}$ is the heat transfer coefficient of the pipeline, $c_p$ is a specific heat capacity of water, $L_{ij}$ is the pipeline length, $m_{ij}$ is the pipeline flow of the node i into the node j;

an energy conservation of a heat source and a load:

for a heat source node and a heat load node, a heat capacity/heat load needs to establish an energy conservation constraint with a temperature difference between the water supply and the backwater, as shown in Equation (11) and Equation (12):

$$H_i^{Source} = c_p m_i (T_i^s - T_i^r) \quad (11);$$

$$H_j^{Load} = c_p m_j (T_j^s - T_j^r) \quad (12);$$

in the equation, $H_i^{Source}$ is a capacity of the heat source node, $H_j^{Load}$ represents a consumption load of the load node, and mi is a pipeline flow directly connected to the heat source; $m_j$ is a pipeline flow directly connected to the load; $T_i^s$ is a water supply temperature of the Heating Network of the heat source node; $T_j^s$ is a backwater temperature of the Heating Network of the heat source node; Tis is a water supply temperature of the Heating Network of the heat load node; $T_j^r$ is a backwater temperature of the Heating Network of the heat load node;

constraints of the heat exchanger model comprise a heat balance constraint of a heat exchanger, wherein:

a water supply temperature of a secondary side pipeline network $T_{g2}$ of the heat exchanger is obtained according to a heat balance equation of the heat exchanger:

$$c_p G_1 (T_{g1} - T_{h1}) = c_p G_2 (T_{g2} - T_{h2}) + c_p G_2 \frac{dT_{g2}}{dt}; \quad (13)$$

in the equation, $c_p$ is a specific heat capacity of water; $G_1$ is a primary side flow of the heat exchanger; $T_{g1}$ is a primary side water supply temperature; $T_{h1}$ is a primary side backwater temperature; $G_2$ is a secondary side flow of the heat exchanger; $T_{g2}$ is a secondary side water supply temperature; $T_{h2}$ is a secondary side backwater temperature, and t represents a time of water temperature change;

the primary side water supply temperature of the heat exchanger is obtained by Equation (14):

$$H_{load} = c_p G_1 \cdot (T_{g1} - T_{h1}) \quad (14);$$

$H_{load}$ represents a primary side heat supply of a water heater;

constraints of the radiator model comprise a heat constraint released by a radiator, wherein:

there is a following relationship between an indoor temperature $T_r$ and an average temperature $T_p$ of the heating radiator:

$$Q = aF \cdot \beta \cdot (T_p - T_r)^{1+b} \quad (15);$$

in the equation, Q is a heat released by the radiator, and a, b, β, F are radiator's own parameters;

an average temperature transmitted by a secondary pipeline network is as follows:

$$T_p = (T_{g2} + T_{h2})/2 \quad T_{g2}/T_{g1} \le 1.7 \quad (16)$$

$$T_p = \frac{T_{g2} - T_{h2}}{\ln \frac{T_{g2} - T_r}{T_{h2} - T_r}} \quad T_{g2}/T_{g1} > 1.7 ;$$

a relative flow is used to characterize an action of a control valve, and is expressed as:

$$\overline{G_2} = \frac{Q_2}{Q_{2s}} \cdot \frac{T_{g2s} - T_{h2s}}{T_{g2} - T_{h2}}; \quad (17)$$

$Q_2$ is an actual heat load of a user; $Q_{2s}$ is a design heat load of the user; $T_{g2s}$ is a design water supply temperature of the user; $T_{h2s}$ is a design backwater temperature of the user;

constraints of the capacity and energy conversion equipment model comprise energy conversion constraints of the combined heat and power (CHP) unit and the heat pump, wherein:

there is energy conversion efficiency between the CHP unit and the heat pump, the equation is as follows:

$$P_{chp} = \eta_e P_e \quad (20);$$

$$H_{chp} = \eta_h P_g \quad (21);$$

$$H_{hp} = \eta_{hp} P_{hp} \quad (22);$$

an unit capacity is related to energy consumption and production efficiency, $P_e$ is a purchase of an electricity of the EHN (kW) per hour, $P_g$ is a purchase of a natural gas of the EHN (kW) per hour; $P_{chp}$ and $H_{chp}$ are an electricity and a heat produced by the CHP unit per hour, $H_{hp}$ is a heat output by the heat pump unit (kW) per hour; $\eta_e$ and $\eta_h$ are efficiency of producing the electricity and the heat of the CHP unit, and $\eta_{hp}$ is the efficiency of outputting the heat of the heat pump unit; $P_{hp}$ is an electricity consumed by a heat pump per hour.

2. The collaborative optimization method for the EHN and the building user according to claim 1, wherein constraints of the building model comprise a heat balance constraint of a wall in a heating zone of the building and a heat balance constraint of an indoor air in the heating zone of the building, wherein:

a relationship between an outdoor temperature, a thermal gain of the heating zone and a wall temperature is expressed by a Resistor-Capacitor (RC) model of the node with the wall and the heating zone, a heat balance equation of the wall in the heating zone is:

$$\begin{cases} C_{1,2}^w \dfrac{dT_{1,2}^w}{dt} = \dfrac{T_1 T_{1,2}^w}{R_{1,2}^w} + \dfrac{T_2 - T_{1,2}^w}{R_{1,2}^w} \\ \quad + r_{1,2} \alpha_{1,2} A_{1,2}^w Q_{1,2}^{rad} \\ C_{1,3}^w \dfrac{dT_{1,3}^w}{dt} = \dfrac{T_1 T_{1,3}^w}{R_{1,3}^w} + \dfrac{T_3 - T_{1,3}^w}{R_{1,3}^w} \\ \quad + r_{1,3} \alpha_{1,3} A_{1,3}^w Q_{1,3}^{rad} \\ C_{1,4}^w \dfrac{dT_{1,4}^w}{dt} = \dfrac{T_1 T_{1,4}^w}{R_{1,4}^w} + \dfrac{T_4 - T_{1,4}^w}{R_{1,4}^w} \\ \quad + r_{1,4} \alpha_{1,4} A_{1,4}^w Q_{1,4}^{rad} \\ C_{1,5}^w \dfrac{dT_{1,5}^w}{dt} = \dfrac{T_1 T_{1,5}^w}{R_{1,5}^w} + \dfrac{T_5 - T_{1,5}^w}{R_{1,5}^w} \\ \quad + r_{1,5} \alpha_{1,5} A_{1,5}^w Q_{1,5}^{rad} \end{cases} \quad (18)$$

wherein $T_{1,2}^w$, $T_{1,3}^w$, $T_{1,4}^w$ and $T_{1,5}^w$ are temperatures of four wall nodes, indicating that the temperature of the wall around the heating zone; $T_1$ is a node temperature of the heating zone and represents the indoor temperature of the heating zone, $T_2$-$T_5$ is a temperature of an adjacent heating zone or the outdoor temperature; $r_{1,2}$ is taken 1 when the wall or roof is exposed to sunlight, otherwise 0; $\alpha_{1,2}$ represents a heat absorption rate of the wall, $A_{1,2}^w$ represents a surface area of the wall, and $Q_{1,2}^{rad}$ is a light intensity corresponding to the wall in a corresponding direction;

a heat balance of the indoor air in the heating zone is expressed as:

$$C_1^r \dfrac{dT_1^r}{dt} = \sum_{j=2}^{5} \dfrac{T_{1,j}^w - T_1^r}{R_{1,j}^w} + \sum \dfrac{T^{out} - T_1^r}{R_{1,j}^{win}} + Q_1^{load} + Q_1^{int} + \tau_{1,j}^{win} A_{1,j}^{win} Q_1^{win}; \quad (19)$$

$C_1^r$ represents a specific heat capacity of the indoor air, $T_1^r$ represents an indoor temperature of a room, $T_{1,j}$ represents a corresponding wall temperature, $T^{out}$ represents an outdoor ambient temperature, $R_{1,j}^w$ represents a thermal resistance of the wall, $R_{1,j}^{win}$ represents a thermal resistance of a window, $Q_1^{load}$ represents an indoor thermal load, $Q_1^{int}$ represents an indoor internal heat gain, comprising a heat dissipation of human body and a heat dissipation of electrical appliance, $\tau_{1,j}^{win}$ represents a light transmittance of the window, $A_{1,j}^{win}$ represents a surface area of the window, and $Q_1^{win}$ represents a light intensity accepted by the window.

3. The collaborative optimization method for the EHN and the building user according to claim 2, wherein in the collaborative optimization model of the EHN and the building user, constraints corresponding to the goal of the lowest operating cost of the EHN comprise: an electricity balance constraint, a heat balance constraint, an energy purchase constraint and a node water temperature constraint, wherein:

an objective function is set to:

$$F(t) = \min \Sigma_t (C_{e,t} P_e + C_{g,t} + P_g) \quad (23);$$

wherein $C_{e,t}$ and $C_{g,t}$ represent price of an electricity and a natural gas at time t, $P_e$ and $P_g$ represent the purchase (kW) of the electricity and the natural gas of the EHN per hour;

electricity balance:

$$P_e + P_{chp} = P_{hp} + P_{load} \quad (24)$$

$$P_{chp} = \eta_e P_g;$$

heat balance:

$$H_{chp} + H_{hp} = H_{load} \quad (25)$$

$$H_{chp} = \eta_h P_g$$

$$H_{hp} = \eta_{hp} P_{hp};$$

restriction of energy purchase:

$$0 \le P_{hp} \le P_{hp}^{max} \quad (26);$$

$$0 \le P_e \le P_{hp}^{max}$$

$$0 \le P_g \le P_{chp}^{max}/\eta_e \quad (27);$$

$$P_{chp} \le P_{load} \quad (28)$$

restriction of the node water temperature:

$$T_s^{min} \le T_{s,i} \le T_s^{max} \quad (29);$$

$$T_r^{min} \le T_{r,i} \le T_r^{max} \quad (30);$$

in the equation, $T_s^{min}$ is a minimum value of a node water supply temperature; $T_{s,i}$ is the node water supply temperature; $T_s^{max}$ is a maximum value of the node water supply temperature; $T_r^{min}$ is a minimum value of a node backwater temperature; $T_{r,i}$ is the node supply water temperature; $T_r^{max}$ is a maximum value of the node backwater temperature.

4. The collaborative optimization method for the EHN and the building user according to claim 1, wherein in the collaborative optimization model of the EHN and the building user, constraints corresponding to the goal of the lowest operating cost of the EHN comprise: an electricity balance constraint, a heat balance constraint, an energy purchase constraint and a node water temperature constraint, wherein:
an objective function is set to:

$$F(t) = \min \Sigma_t (C_{e,t} P_e + C_{g,t} P_g) \quad (23);$$

wherein $C_{e,t}$ and $C_{g,t}$ represent price of an electricity and a natural gas at time t, $P_e$ and $P_g$ represent the purchase (kW) of the electricity and the natural gas of the EHN per hour;

electricity balance:

$$P_e + P_{chp} = P_{hp} + P_{load} \quad (24)$$

$$P_{chp} = \eta_e P_g;$$

heat balance:

$$H_{chp} + H_{hp} = H_{load} \quad (25)$$

$$H_{chp} = \eta_h P_g$$

$$H_{hp} = \eta_{hp} P_{hp};$$

restriction of energy purchase:

$$0 \leq P_{hp} \leq P_{hp}^{max} \quad (26);$$

$$0 \leq P_e \leq P_{hp}^{max}$$

$$0 \leq P_g \leq P_{chp}^{max}/\eta_e \quad (27);$$

$$P_{chp} \leq P_{load} \quad (28);$$

restriction of the node water temperature:

$$T_s^{min} \leq T_{s,i} \leq T_s^{max} \quad (29);$$

$$T_r^{min} \leq T_{r,i} \leq T_r^{max} \quad (30);$$

in the equation, $T_s^{min}$ is a minimum value of a node water supply temperature; $T_{s,i}$ is the node water supply temperature; $T_s^{max}$ is a maximum value of the node water supply temperature; $T_r^{min}$ is a minimum value of a node backwater temperature; $T_{r,i}$ is the node supply water temperature; $T_r^{max}$ is a maximum value of the node backwater temperature.

5. The collaborative optimization method for the EHN and the building user according to claim 4, wherein in the collaborative optimization model of the EHN and the building user, constraints corresponding to the goal of the lowest heat consumption of the building user comprise: a user strategy constraint and a radiator property constraint, wherein:

an objective function is set to:

$$F(t) = \min\left(\sum_{t=1}^{24} Q_t^{load} \cdot \Delta t\right); \quad (31)$$

wherein $Q_t^{load}$ represents a heat load of a heating consumer; $\Delta t$ represents a scheduling time; the user strategy constraint:

$$T_t^r = T_t^{adj}, \forall t \quad (35);$$

in the equation, $T_t^r$ represents the indoor temperature at time t, $T_t^{adj}$ represents the indoor temperature of an adjacent room at time t;

the radiator property constraint:

$$0 \leq \overline{G_2} \leq 1 \quad (36);$$

$$T_{min} \leq T_{h2} \leq T_{h2s} \quad (37);$$

in the equation, $T_{min}$ represents a minimum temperature of the secondary side backwater temperature of the radiator.

6. A collaborative optimization equipment for an EHN and a building user, comprising:
a processor and a memory;
wherein the memory is used to store a computer program, and the processor calls the computer program stored in the memory to perform the collaborative optimization method for the EHN and the building user according to claim 1.

7. The collaborative optimization equipment for the EHN and the building user according to claim 6, wherein constraints of the building model comprise a heat balance constraint of a wall in a heating zone of the building and a heat balance constraint of an indoor air in the heating zone of the building, wherein:
a relationship between an outdoor temperature, a thermal gain of the heating zone and a wall temperature is expressed by an RC model of the node with the wall and the heating zone, a heat balance equation of the wall in the heating zone is:

$$\begin{cases} C_{1,2}^w \dfrac{dt_{1,2}^w}{dt} = \dfrac{T_1 - T_{1,2}^w}{R_{1,2}^w} + \dfrac{T_2 - T_{1,2}^w}{R_{1,2}^w} \\ \quad + r_{1,2}\alpha_{1,2}A_{1,2}^w Q_{1,2}^{rad} \\ C_{1,3}^w \dfrac{dT_{1,3}^w}{dt} = \dfrac{T_1 - T_{1,3}^w}{R_{1,3}^w} + \dfrac{T_3 - T_{1,3}^w}{R_{1,3}^w} \\ \quad + r_{1,3}\alpha_{1,3}A_{1,3}^w Q_{1,3}^{rad} \\ C_{1,4}^w \dfrac{dT_{1,4}^w}{dt} = \dfrac{T_1 - T_{1,4}^w}{R_{1,4}^w} + \dfrac{T_4 - T_{1,4}^w}{R_{1,4}^w} \\ \quad + r_{1,4}\alpha_{1,4}A_{1,4}^w Q_{1,4}^{rad} \\ C_{1,5}^w \dfrac{dT_{1,5}^w}{dt} = \dfrac{T_1 - T_{1,5}^w}{R_{1,5}^w} + \dfrac{T_5 - T_{1,5}^w}{R_{1,5}^w} \\ \quad + r_{1,5}\alpha_{1,5}A_{1,5}^w Q_{1,5}^{rad} \end{cases} \quad (18)$$

wherein $T_{1,2}^w$, $T_{1,3}^w$, $T_{1,4}^w$ and $T_{1,5}^w$ are temperatures of four wall nodes, indicating that the temperature of the wall around the heating zone; $T_1$ is a node temperature of the heating zone and represents the indoor temperature of the heating zone, $T_2$-$T_5$ is a temperature of an adjacent heating zone or the outdoor temperature; $r_{1,2}$ is taken 1 when the wall or roof is exposed to sunlight, otherwise 0; $\alpha_{1,2}$ represents a heat absorption rate of the wall, $A_{1,2}^w$ represents a surface area of the wall, and $Q_{1,2}^{rad}$ is a light intensity corresponding to the wall in a corresponding direction;

a heat balance of the indoor air in the heating zone is expressed as:

$$C_1^r \frac{dT_1^r}{dt} = \sum_{j=2}^{5} \frac{T_{1,j}^w - T_1^r}{R_{1,j}^w} + \sum \frac{T^{out} - T_1^r}{R_{1,j}^{win}} + Q_1^{load} + Q_1^{int} + \tau_{1,j}^{win} A_{1,j}^{win} Q_1^{win} \quad (19)$$

$C_1^r$ represents a specific heat capacity of the indoor air, $T_1^r$ represents an indoor temperature of a room, $T_{1,j}^w$ represents a corresponding wall temperature, $T^{out}$ represents an outdoor ambient temperature, $R_{1,j}^w$ represents a thermal resistance of the wall, $R_{1,j}^{win}$ represents a thermal resistance of a window, $Q_1^{load}$ represents an indoor thermal load, $Q_1^{int}$ represents an indoor internal heat gain, comprising a heat dissipation of human body and a heat dissipation of electrical appliance, $\tau_{1,j}^{win}$ represents a light transmittance of the window, $A_{1,j}^{win}$ represents a surface area of the window, and $Q_1^{win}$ represents a light intensity accepted by the window.

8. The collaborative optimization equipment for the EHN and the building user according to claim 6, wherein in the collaborative optimization model of the EHN and the building user, constraints corresponding to the goal of the lowest operating cost of the EHN comprise: an electricity balance constraint, a heat balance constraint, an energy purchase constraint and a node water temperature constraint, wherein:
an objective function is set to:

$$F(t) = \min \Sigma_t (C_{e,t} P_e + C_{g,t} + P_g) \quad (23);$$

wherein $C_{e,t}$ and $C_{g,t}$ represent price of an electricity and a natural gas at time t, $P_e$ and $P_g$ represent the purchase (kW) of the electricity and the natural gas of the EHN per hour;
electricity balance:

$$P_e + P_{chp} = P_{hp} + P_{load} \quad (24)$$
$$P_{chp} = \eta_e P_g;$$

heat balance:

$$H_{chp} + H_{hp} = H_{load} \quad (25)$$
$$H_{chp} = \eta_h P_g$$
$$H_{hp} = \eta_{hp} P_{hp};$$

restriction of energy purchase:

$$0 \le P_{hp} \le P_{hp}^{max} \quad (26);$$
$$0 \le P_e \le P_{hp}^{max}$$
$$0 \le P_g \le P_{chp}^{max}/\eta_e \quad (27);$$
$$P_{chp} \le P_{load} \quad (28);$$

restriction of the node water temperature:

$$T_s^{min} \le T_{s,i} \le T_s^{max} \quad (29);$$
$$T_r^{min} \le T_{r,i} \le T_r^{max} \quad (30);$$

in the equation, $T_s^{min}$ is a minimum value of a node water supply temperature; $T_{s,i}$ is the node water supply temperature; $T_s^{max}$ is a maximum value of the node water supply temperature; $T_r^{min}$ is a minimum value of a node backwater temperature; $T_{r,i}$ is the node supply water temperature; $T_r^{max}$ is a maximum value of the node backwater temperature.

9. The collaborative optimization equipment for the EHN and the building user according to claim 8, wherein in the collaborative optimization model of the EHN and the building user, constraints corresponding to the goal of the lowest heat consumption of the building user comprise: a user strategy constraint and a radiator property constraint, wherein:
an objective function is set to:

$$F(t) = \min\left(\sum_{t=1}^{24} Q_t^{load} \cdot \Delta t\right); \quad (31)$$

wherein $Q_t^{load}$ represents a heat load of a heating consumer; $\Delta t$ represents a scheduling time; the user strategy constraint:

$$T_t^r = T_t^{adj}, \forall t \quad (35);$$

in the equation, TE represents the indoor temperature at time t, Tad) represents the indoor temperature of an adjacent room at time t;
the radiator property constraint:

$$0 \le \overline{G_2} \le 1 \quad (36);$$
$$T_{min} \le T_{h2} \le T_{h2s} \quad (37);$$

in the equation, $T_{min}$ represents a minimum temperature of the secondary side backwater temperature of the radiator.

10. A computer readable storage medium, wherein the computer readable storage medium stores a computer program, and when the computer program is executed by a processor, the processor performs the collaborative optimization method for the EHN and the building user according to claim 1.

11. The computer readable storage medium according to claim 10, wherein constraints of the building model comprise a heat balance constraint of a wall in a heating zone of the building and a heat balance constraint of an indoor air in the heating zone of the building, wherein:
a relationship between an outdoor temperature, a thermal gain of the heating zone and a wall temperature is expressed by an RC model of the node with the wall and the heating zone, a heat balance equation of the wall in the heating zone is:

$$\begin{cases} C_{1,2}^w \frac{dT_{1,2}^w}{dt} = \frac{T_1 - T_{1,2}^w}{R_{1,2}^w} + \frac{T_2 - T_{1,2}^w}{R_{1,2}^w} \\ \quad + r_{1,2} \alpha_{1,2} A_{1,2}^w Q_{1,2}^{rad} \\ C_{1,3}^w \frac{dT_{1,3}^w}{dt} = \frac{T_1 - T_{1,3}^w}{R_{1,3}^w} + \frac{T_3 - T_{1,3}^w}{R_{1,3}^w} \\ \quad + r_{1,3} \alpha_{1,3} A_{1,3}^w Q_{1,3}^{rad} \\ C_{1,4}^w \frac{dT_{1,4}^w}{dt} = \frac{T_1 - T_{1,4}^w}{R_{1,4}^w} + \frac{T_4 - T_{1,4}^w}{R_{1,4}^w} \\ \quad + r_{1,4} \alpha_{1,4} A_{1,4}^w Q_{1,4}^{rad} \\ C_{1,5}^w \frac{dT_{1,5}^w}{dt} = \frac{T_1 - T_{1,5}^w}{R_{1,5}^w} + \frac{T_5 - T_{1,5}^w}{R_{1,5}^w} \\ \quad + r_{1,5} \alpha_{1,5} A_{1,5}^w Q_{1,5}^{rad} \end{cases} \quad (18)$$

wherein $T_{1,2}^w$, $T_{1,3}^w$, $T_{1,4}^w$ and $T_{1,5}^w$ are temperatures of four wall nodes, indicating that the temperature of the wall around the heating zone; $T_1$ is a node temperature of the heating zone and represents the indoor temperature of the heating zone, $T_2$-$T_5$ is a temperature of an adjacent heating zone or the outdoor temperature; $r_{1,2}$ is taken 1 when the wall or roof is exposed to sunlight, otherwise 0; $\alpha_{1,2}$ represents a heat absorption rate of the wall, $A_{1,2}^w$ represents a surface area of the wall, and $Q_{1,2}^{rad}$ is a light intensity corresponding to the wall in a corresponding direction;

a heat balance of the indoor air in the heating zone is expressed as:

$$C_1^r \frac{dT_1^r}{dt} = \sum_{j=2}^{5} \frac{T_{1,j}^w - T_1^r}{R_{1,j}^w} + \sum \frac{T^{out} - T_1^r}{R_{1,j}^{win}} + Q_1^{load} + Q_1^{int} + \tau_{1,j}^{win} A_{1,j}^{win} Q_1^{win} \quad (19)$$

$C_1^r$ represents a specific heat capacity of the indoor air, $T_1^r$ represents an indoor temperature of a room, $T_{1,j}^w$ represents a corresponding wall temperature, $T^{out}$ represents an outdoor ambient temperature, $R_{1,j}^w$ represents a thermal resistance of the wall, $R_{1,j}^{win}$ represents a thermal resistance of a window, $Q_1^{load}$ represents an indoor thermal load, $Q_1^{int}$ represents an indoor internal heat gain, comprising a heat dissipation of human body and a heat dissipation of electrical appliance, Twin represents a light transmittance of the window, $A_{1,j}^{win}$ represents a surface area of the window, and $Q_1^{win}$ represents a light intensity accepted by the window.

12. The computer readable storage medium according to claim 10, wherein in the collaborative optimization model of the EHN and the building user, constraints corresponding to the goal of the lowest operating cost of the EHN comprise: an electricity balance constraint, a heat balance constraint, an energy purchase constraint and a node water temperature constraint, wherein:

an objective function is set to:

$$F(t) = \min \Sigma_t (C_{e,t} P_e + C_{g,t} P_g) \quad (23);$$

wherein $C_{e,t}$ and $C_{g,t}$ represent price of an electricity and a natural gas at time t, $P_e$ and $P_g$ represent the purchase (kW) of the electricity and the natural gas of the EHN per hour;

electricity balance:

$$P_e + P_{chp} = P_{hp} + P_{load} \quad (24)$$

$$P_{chp} = \eta_e P_g;$$

heat balance:

$$H_{chp} + H_{hp} = H_{load} \quad (25)$$

$$H_{chp} = \eta_h P_g$$

$$H_{hp} = \eta_{hp} P_{hp};$$

restriction of energy purchase:

$$0 \leq P_{hp} \leq P_{hp}^{max} \quad (26);$$

$$0 \leq P_e \leq P_{hp}^{max}$$

$$0 \leq P_g \leq P_{chp}^{max}/\eta_e \quad (27);$$

$$P_{chp} \leq P_{load} \quad (28)$$

restriction of the node water temperature:

$$T_s^{min} \leq T_{s,i} \leq T_s^{max} \quad (29);$$

$$T_r^{min} \leq T_{r,i} \leq T_r^{max} \quad (30);$$

in the equation, $T_s^{min}$ is a minimum value of a node water supply temperature; $T_{s,i}$ is the node water supply temperature; $T_s^{max}$ is a maximum value of the node water supply temperature; $T_r^{min}$ is a minimum value of a node backwater temperature; $T_{r,i}$ is the node supply water temperature; $T_r^{max}$ is a maximum value of the node backwater temperature.

13. The computer readable storage medium according to claim 12, wherein in the collaborative optimization model of the EHN and the building user, constraints corresponding to the goal of the lowest heat consumption of the building user comprise: a user strategy constraint and a radiator property constraint, wherein:

an objective function is set to:

$$F(t) = \min \left( \sum_{t=1}^{24} Q_t^{load} \cdot \Delta t \right); \quad (31)$$

wherein $Q_t^{load}$ represents a heat load of a heating consumer; $\Delta t$ represents a scheduling time; the user strategy constraint:

$$T_t^r = T_t^{adj}, \forall t \quad (35);$$

in the equation, $T_t^r$ represents the indoor temperature at time t, $T_t^{adj}$ represents the indoor temperature of an adjacent room at time t;

the radiator property constraint:

$$0 \leq \overline{G_2} \leq 1 \quad (36);$$

$$T_{min} \leq T_{h2} \leq T_{h2s} \quad (37);$$

in the equation, $T_{min}$ represents a minimum temperature of the secondary side backwater temperature of the radiator.

14. A collaborative optimization system for an EHN and a building user, comprising:

an establishing processor, wherein the establishing processor is used to establish a coordinated optimization scheduling framework of the EHN and a building in a park;

a first construction processor, wherein the first construction processor is used to construct an optimal thermal power flow scheduling model of the EHN and construct a building model to simulate thermal characteristics and energy consumption of the building based on the coordinated optimization scheduling framework;

a second construction processor, wherein the second construction processor is used to construct a collaborative optimization model of the EHN and the building user based on the optimal thermal power flow scheduling model and the building model, and taking a lowest operation cost of the EHN and a lowest heat consumption of the building user as a goal; and an outputting processor, wherein the outputting processor is used to output a collaborative optimization scheme of an optimal thermal power flow scheduling of the EHN and a heat consumption of the building user through the collaborative optimization model of the EHN and the building user to a controller for controlling a heating radiator, a combined heat and power (CHP) unit and a heat pump based on the collaborative optimization scheme;

wherein the optimal thermal power flow scheduling model comprises a hydraulic model, a thermal model, a heat exchanger model, a radiator model and a capacity and energy conversion equipment model;

constraints of the hydraulic model comprise a node net flow constraint and a head loss constraint, wherein:

a node net flow is according to an energy conservation law, each heating network node satisfies following rules:

$$m_q = \Sigma m_{in} - \Sigma m_{out} \quad (1)$$

wherein $m_{in}$ and $m_{out}$ represent pipeline flow entering and flowing out of a Heating Network respectively, and $m_q$ is a node net flow in the Heating Network;

a node net flow equation of the hydraulic model is obtained from Equation (1):

$$A\dot{m} = \dot{m}_q \quad (2)$$

wherein m is a pipeline flow in the Heating Network, $\dot{m}$ represents a matrix of m, $\dot{m}_q$ represents a matrix of $m_q$, and A is a correlation matrix of a node and a pipeline, and an element is defined as:

$$\begin{cases} +1, & \text{A flow direction is from the pipeline to the node.} \\ -1, & \text{The flow direction is from the node to the pipeline.} \\ 0, & \text{There is no connection between the node and the pipeline.} \end{cases} \quad (3)$$

a pressure change per unit distance caused by pipeline friction is called head loss, a circulating pressure equation represents a sum of the head loss of a network loop, and a sum of the circulating pressure in an entire network is zero:

$$\Sigma h_f = 0 \quad (4)$$

wherein $h_f$ is a pipeline pressure loss scalar in the network loop;

$$h_f = Km|m| \quad (5)$$

wherein K is a resistance coefficient of a network pipeline, and K is mainly determined by a pipeline diameter;

$$K = \frac{8Lf}{D^5 \rho^2 \pi^2 g}; \quad (6)$$

wherein L is a pipeline length, D is the pipeline diameter, $\rho$ is a water density, g is an acceleration of gravity, f is a friction coefficient and is determined according to Reynolds number;

from Equation (4) and Equation (5), a head loss equation in the hydraulic model is obtained:

$$Bh_f = BK\dot{m}|\dot{m}| = 0 \quad (7)$$

wherein $h_f$ represents a head pressure loss vector; B is a correlation matrix of the network loop and a branch, and an element of the B is defined as:

$$\begin{cases} +1, & \text{A branch flow direction is the same as the loop definition direction.} \\ -1, & \text{The branch flow direction is opposite to the loop definition direction.} \\ 0, & \text{The branch does not belong to the loop.} \end{cases} \quad (8)$$

constraints of the thermal model comprise a node flow conservation constraint, a pipeline heat dissipation constraint, and an energy conservation constraint of heat source and load, wherein:

a node flow conservation:

if a flow of multiple pipelines flows into a same node, then a node temperature is a mixing temperature $T_j^{out}$ of an injected flow of each pipeline;

according to the energy conservation law, an outlet temperature of water supply/backwater at any node multiplied by a total outlet flow is equal to a sum of a product of all inlet temperatures and corresponding flows:

$$\Sigma_{i:i \to j} m_{ij} T_{ij}^{in} = (\Sigma_{j:j \to k} m_{jk}) T_j^{out} \quad (9)$$

as shown in Equation (9), for any node j, i represents different inlets to the node j, and k represents different outlets to the node j, in the Equation (9), $T_j^{out}$ is a water supply (backwater) temperature at a node outlet, $m_{ij}$ is the pipeline flow of the node i into the node j, $m_{jk}$ represents the pipeline flow of the node j into the node k, and $T_{ij}^{in}$ is the water supply (backwater) temperature at the node inlet, a number of node inlets is determined by a topology of a Heat Pipeline Network; an inlet temperature of the node is transported from a previous node i, and the water has experienced loss between a pipeline section i→j;

a pipeline heat dissipation:

the Heat Pipeline Network dissipates heat to a surrounding environment during transmission, a temperature loss is related to an ambient temperature, a heat transfer coefficient and other factors, for the pipeline between any nodes i→j:

$$T_{ij}^{out} = (T_{ij}^{in} - T^a) e^{-\frac{\lambda_{ij} L_{ij}}{c_p m_{ij}}} + T^a; \quad (10)$$

wherein $T_{ij}^{in}$ and $T_{ij}^{out}$ represent temperatures of first and last nodes of the pipeline, $T^a$ is an external ambient temperature, $\lambda_{ij}$ is the heat transfer coefficient of the pipeline, $c_p$ is a specific heat capacity of water, $L_{ij}$ is the pipeline length, $m_{ij}$ is the pipeline flow of the node i into the node j;

an energy conservation of a heat source and a load:

for a heat source node and a heat load node, a heat capacity/heat load needs to establish an energy conservation constraint with a temperature difference between the water supply and the backwater, as shown in Equation (11) and Equation (12):

$$H_i^{Source} = c_p m_i (T_i^s - T_i^r) \quad (11)$$

$$H_j^{Load} = c_p m_j (T_j^s - T_j^r) \quad (12)$$

in the equation, $H_i^{Source}$ is a capacity of the heat source node, $H_j^{Load}$ represents a consumption load of the load node, and mi is a pipeline flow directly connected to the heat source; $m_j$ is a pipeline flow directly connected to the load; $T_i^s$ is a water supply temperature of the Heating Network of the heat source node; $T_j^s$ is a backwater temperature of the Heating Network of the heat source node; $T_j^s$ is a water supply temperature of the Heating Network of the heat load node; $T_j^r$ is a backwater temperature of the Heating Network of the heat load node;

constraints of the heat exchanger model comprise a heat balance constraint of a heat exchanger, wherein:

a water supply temperature of a secondary side pipeline network $T_{g2}$ of the heat exchanger is obtained according to a heat balance equation of the heat exchanger:

$$c_p G_1 (T_{g1} - T_{h1}) = c_p G_2 (T_{g2} - T_{h2}) + c_p G_2 \frac{dT_{g2}}{dt}; \quad (13)$$

in the equation, $c_p$ is a specific heat capacity of water; $G_1$ is a primary side flow of the heat exchanger; $T_{g1}$ is a primary side water supply temperature; $T_{h1}$ is a primary side backwater temperature; $G_2$ is a secondary side flow of the heat exchanger; $T_{g2}$ is a secondary side water supply temperature; $T_{h2}$ is a secondary side backwater temperature, and t represents a time of water temperature change;

the primary side water supply temperature of the heat exchanger is obtained by Equation (14):

$$H_{load} = c_p G_1 \cdot (T_{g1} - T_{h1}) \quad (14);$$

$H_{load}$ represents a primary side heat supply of a water heater;

constraints of the radiator model comprise a heat constraint released by a radiator, wherein:

there is a following relationship between an indoor temperature $T_r$ and an average temperature $T_p$ of the heating radiator:

$$Q = aF \cdot \beta \cdot (T_p - T_r)^{1+b} \quad (15);$$

in the equation, Q is a heat released by the radiator, and a, b, β, F are radiator's own parameters;

an average temperature transmitted by a secondary pipeline network is as follows:

$$T_p = (T_{g2} + T_{h2})/2 \quad T_{g2}/T_{g1} \le 1.7 \quad (16)$$
$$T_p = \frac{T_{g2} - T_{h2}}{\ln \frac{T_{g2} - T_r}{T_{h2} - T_r}} \quad T_{g2}/T_{g1} > 1.7 \; ;$$

a relative flow is used to characterize an action of a control valve, and is expressed as:

$$\overline{G_2} = \frac{Q_2}{Q_{2s}} \cdot \frac{T_{g2s} - T_{h2s}}{T_{g2} - T_{h2}}; \quad (17)$$

$Q_2$ is an actual heat load of a user; $Q_{2s}$ is a design heat load of the user; $T_{g2s}$ is a design water supply temperature of the user; $T_{h2s}$ is a design backwater temperature of the user;

constraints of the capacity and energy conversion equipment model comprise energy conversion constraints of the combined heat and power (CHP) unit and the heat pump, wherein:

there is energy conversion efficiency between the CHP unit and the heat pump, the equation is as follows:

$$P_{chp} = \eta_e P_e \quad (20);$$

$$H_{chp} = \eta_h P_g \quad (21);$$

$$H_{hp} = \eta_{hp} P_{hp} \quad (22);$$

an unit capacity is related to energy consumption and production efficiency, $P_e$ is a purchase of an electricity of the EHN (kW) per hour, $P_g$ is a purchase of a natural gas of the EHN (kW) per hour; $P_{chp}$ and $H_{chp}$ are an electricity and a heat produced by the CHP unit per hour, $H_{hp}$ is a heat output by the heat pump unit (kW) per hour; $\eta_e$ and $\eta_h$ are efficiency of producing the electricity and the heat of the CHP unit, and $\eta_{hp}$ is the efficiency of outputting the heat of the heat pump unit; $P_{hp}$ is an electricity consumed by a heat pump per hour.

15. The collaborative optimization system for the EHN and the building user according to claim 14, wherein constraints of the building model comprise a heat balance constraint of a wall in a heating zone of the building and a heat balance constraint of an indoor air in the heating zone of the building, wherein:

a relationship between an outdoor temperature, a thermal gain of the heating zone and a wall temperature is expressed by an RC model of the node with the wall and the heating zone, a heat balance equation of the wall in the heating zone is:

$$\begin{cases} C_{1,2}^w \frac{dT_{1,2}^w}{dt} = \frac{T_1 - T_{1,2}^w}{R_{1,2}^w} + \frac{T_2 - T_{1,2}^w}{R_{1,2}^w} & (18) \\ + r_{1,2} \alpha_{1,2} A_{1,2}^w Q_{1,2}^{rad} \\ C_{1,3}^w \frac{dT_{1,3}^w}{dt} = \frac{T_1 - T_{1,3}^w}{R_{1,3}^w} + \frac{T_3 - T_{1,3}^w}{R_{1,3}^w} \\ + r_{1,3} \alpha_{1,3} A_{1,3}^w Q_{1,3}^{rad} \\ C_{1,4}^w \frac{dT_{1,4}^w}{dt} = \frac{T_1 - T_{1,4}^w}{R_{1,4}^w} + \frac{T_4 - T_{1,4}^w}{R_{1,4}^w} \; ; \\ + r_{1,4} \alpha_{1,4} A_{1,4}^w Q_{1,4}^{rad} \\ C_{1,5}^w \frac{dT_{1,5}^w}{dt} = \frac{T_1 - T_{1,5}^w}{R_{1,5}^w} + \frac{T_5 - T_{1,5}^w}{R_{1,5}^w} \\ + r_{1,5} \alpha_{1,5} A_{1,5}^w Q_{1,5}^{rad} \end{cases}$$

wherein $T_{1,2}^w$, $T_{1,3}^w$, $T_{1,4}^w$ and $T_{1,5}^w$ are temperatures of four wall nodes, indicating that the temperature of the wall around the heating zone; $T_1$ is a node temperature of the heating zone and represents the indoor temperature of the heating zone, $T_2$-$T_5$ is a temperature of an adjacent heating zone or the outdoor temperature; $r_{1,2}$ is taken 1 when the wall or roof is exposed to sunlight, otherwise 0; $\alpha_{1,2}$ represents a heat absorption rate of the wall, $A_{1,2}^w$ represents a surface area of the wall, and $Q_{1,2}^{rad}$ is a light intensity corresponding to the wall in a corresponding direction;

a heat balance of the indoor air in the heating zone is expressed as:

$$C_1^r \frac{dT_1^r}{dt} = \quad (19)$$

$$\sum_{j=2}^{5} \frac{T_{1,j}^w - T_1^r}{R_{1,j}^w} + \sum \frac{T^{out} - T_1^r}{R_{1,j}^{win}} + Q_1^{load} + Q_1^{int} + \tau_{1,j}^{win} A_{1,j}^{win} Q_1^{win};$$

$C_1^r$ represents a specific heat capacity of the indoor air, $T_1^r$ represents an indoor temperature of a room, $T_{1,j}^w$ represents a corresponding wall temperature, $T^{out}$ represents an outdoor ambient temperature, $R_{1,j}^w$ represents a thermal resistance of the wall, $R_{1,j}^{win}$ represents a thermal resistance of a window, $Q_1^{load}$ represents an indoor thermal load, $Q_1^{int}$ represents an indoor internal heat gain, comprising a heat dissipation of human body and a heat dissipation of electrical appliance, $\tau_{1,j}^{win}$ represents a light transmittance of the window, $A_{1,j}^{win}$ represents a surface area of the window, and $Q_1^{win}$ represents a light intensity accepted by the window.

16. The collaborative optimization system for the EHN and the building user according to claim 15, wherein in the collaborative optimization model of the EHN and the building user, constraints corresponding to the goal of the lowest operating cost of the EHN comprise: an electricity balance constraint, a heat balance constraint, an energy purchase constraint and a node water temperature constraint, wherein:

an objective function is set to:

$$F(t)=\min\Sigma_t(C_{e,t}P_e+C_{g,t}P_g) \tag{23}$$

wherein $C_{e,t}$ and $C_{g,t}$ represent price of an electricity and a natural gas at time t, $P_e$ and $P_g$ represent the purchase (kW) of the electricity and the natural gas of the EHN per hour;

electricity balance:

$$P_e + P_{chp} = P_{hp} + P_{load} \tag{24}$$

$$P_{chp} = \eta_e P_g;$$

heat balance:

$$H_{chp} + H_{hp} = H_{load} \tag{25}$$

$$H_{chp} = \eta_h P_g$$

$$H_{hp} = \eta_{hp} P_{hp};$$

restriction of energy purchase:

$$0 \leq P_{hp} \leq P_{hp}^{max} \tag{26}$$

$$0 \leq P_e \leq P_{hp}^{max}$$

$$0 \leq P_g \leq P_{chp}^{max}/\eta_e \tag{27}$$

$$P_{chp} \leq P_{load} \tag{28}$$

restriction of the node water temperature:

$$T_s^{min} \leq T_{s,i} \leq T_s^{max} \tag{29}$$

$$T_r^{min} \leq T_{r,i} \leq T_r^{max} \tag{30}$$

in the equation, $T_s^{min}$ is a minimum value of a node water supply temperature; $T_{s,i}$ is the node water supply temperature; $T_s^{max}$ is a maximum value of the node water supply temperature; $T_r^{min}$ is a minimum value of a node backwater temperature; $T_r,i$ is the node supply water temperature; $T_r^{max}$ is a maximum value of the node backwater temperature.

17. The collaborative optimization system for the EHN and the building user according to claim 14, wherein in the collaborative optimization model of the EHN and the building user, constraints corresponding to the goal of the lowest operating cost of the EHN comprise: an electricity balance constraint, a heat balance constraint, an energy purchase constraint and a node water temperature constraint, wherein:

an objective function is set to:

$$F(t)=\min\Sigma_t(C_{e,t}P_e+C_{g,t}P_g) \tag{23}$$

wherein $C_{e,t}$ and $C_{g,t}$ represent price of an electricity and a natural gas at time t, $P_e$ and $P_g$ represent the purchase (kW) of the electricity and the natural gas of the EHN per hour;

electricity balance:

$$P_e + P_{chp} = P_{hp} + P_{load} \tag{24}$$

$$P_{chp} = \eta_e P_g;$$

heat balance:

$$H_{chp} + H_{hp} = H_{load} \tag{25}$$

$$H_{chp} = \eta_h P_g$$

$$H_{hp} = \eta_{hp} P_{hp};$$

restriction of energy purchase:

$$0 \leq P_{hp} \leq P_{hp}^{max} \tag{26}$$

$$0 \leq P_e \leq P_{hp}^{max}$$

$$0 \leq P_g \leq P_{chp}^{max}/\eta_e \tag{27}$$

$$P_{chp} \leq P_{load} \tag{28}$$

restriction of the node water temperature:

$$T_s^{min} \leq T_{s,i} \leq T_s^{max} \tag{29}$$

$$T_r^{min} \leq T_{r,i} \leq T_r^{max} \tag{30}$$

in the equation, $T_s^{min}$ is a minimum value of a node water supply temperature; $T_{s,i}$ is the node water supply temperature; $T_s^{max}$ is a maximum value of the node water supply temperature; $T_s^{min}$ is a minimum value of a node backwater temperature; $T_{r,i}$ is the node supply water temperature; $T_r^{max}$ is a maximum value of the node backwater temperature.

18. The collaborative optimization system for the EHN and the building user according to claim 17, wherein in the collaborative optimization model of the EHN and the building user, constraints corresponding to the goal of the lowest heat consumption of the building user comprise: a user strategy constraint and a radiator property constraint, wherein:

an objective function is set to:

$$F(t) = \min\left(\sum_{t=1}^{24} Q_t^{load} \cdot \Delta t\right); \tag{31}$$

wherein $Q_t^{load}$ represents a heat load of a heating consumer; $\Delta t$ represents a scheduling time; the user strategy constraint:

$$T_t^r = T_t^{adj}, \forall t \tag{35}$$

in the equation, $T_t^r$ represents the indoor temperature at time t, $T_t^{adj}$ represents the indoor temperature of an adjacent room at time t;

the radiator property constraint:

$$0 \leq \overline{G_2} \leq 1 \quad (36);$$

$$T_{min} \leq T_{h2} \leq T_{h2s} \quad (37);$$

in the equation, $T_{min}$ represents a minimum temperature of the secondary side backwater temperature of the radiator.

* * * * *